(12) United States Patent
Mirbozorgi et al.

(10) Patent No.: US 10,432,025 B2
(45) Date of Patent: Oct. 1, 2019

(54) SMART MULTICOIL INDUCTIVELY-COUPLED ARRAY FOR WIRELESS POWER TRANSMISSION

(71) Applicants: UNIVERSITÉ LAVAL, Québec (CA); POLYVALOR, LIMITED PARTNERSHIP, Montréal (CA)

(72) Inventors: Seyedabdollah Mirbozorgi, Atlanta, GA (US); Benoit Gosselin, Québec (CA); Mohamad Sawan, Québec (CA)

(73) Assignees: Polyvalor, Limited Partnership, Montréal. QC (CA); Université Laval, Québec, QC (CA)

( * ) Notice: Subject to any disclaimer, the term of this patent is extended or adjusted under 35 U.S.C. 154(b) by 853 days.

(21) Appl. No.: 14/899,949

(22) PCT Filed: Jun. 25, 2014

(86) PCT No.: PCT/IB2014/062595
§ 371 (c)(1),
(2) Date: Dec. 18, 2015

(87) PCT Pub. No.: WO2014/207677
PCT Pub. Date: Dec. 31, 2014

(65) Prior Publication Data
US 2016/0172104 A1 Jun. 16, 2016

Related U.S. Application Data
(60) Provisional application No. 61/840,584, filed on Jun. 28, 2013.

(51) Int. Cl.
*H02J 50/12* (2016.01)
*H02J 5/00* (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01); *H02J 17/00* (2013.01); *H02J 50/40* (2016.02)

(58) Field of Classification Search
CPC ............. H02J 7/025; H02J 5/005; H02J 50/12
(Continued)

(56) References Cited

U.S. PATENT DOCUMENTS

| | | |
|---|---|---|
| 6,400,991 B1 | 6/2002 | Kung |
| 8,090,550 B2 | 1/2012 | Azancot et al. |

(Continued)

FOREIGN PATENT DOCUMENTS

| | | | | |
|---|---|---|---|---|
| JP | 2011155732 | 8/2011 | ............... | B06L 11/18 |
| JP | 2011234566 | 11/2011 | ............... | B60L 11/18 |

OTHER PUBLICATIONS

Yaoyao Jia et al., "A Closed-Loop Wireless Homecage for Optogenetic Stimulation Experiements", 2015 IEEE Biomedical Circuits and Systems Conference (BioCAS), Oct. 22-24, 2015, 4 pages, IEEE, Atlanta, GA, USA.

(Continued)

*Primary Examiner* — Richard V Muralidar
(74) *Attorney, Agent, or Firm* — Dawn-Marie Bey; Bey & Cotropia PLLC

(57) ABSTRACT

A power surface or chamber having nearly constant electromagnetic field distribution in 3D comprising at least one primary coil and one primary resonance array made of several coils connected in parallel for generating the electromagnetic field distribution; a single power driver circuit for activating the coils; and a secondary coil and an optional secondary resonance coil to recover the generated electromagnetic field and power up an electric device.

11 Claims, 20 Drawing Sheets

(51) Int. Cl.
*H02J 50/40* (2016.01)
*H02J 17/00* (2006.01)
*H01F 38/14* (2006.01)
*H02J 7/02* (2016.01)

(58) Field of Classification Search
USPC .......................................................... 320/108
See application file for complete search history.

(56) References Cited

U.S. PATENT DOCUMENTS

| | | | |
|---|---|---|---|
| 8,278,784 | B2 | 10/2012 | Cook et al. |
| 8,299,652 | B2 | 10/2012 | Sample et al. |
| 2010/0181844 | A1 | 7/2010 | Karalis et al. |
| 2010/0237709 | A1 | 9/2010 | Hall et al. |
| 2011/0140538 | A1 | 6/2011 | Jung et al. |
| 2011/0148215 | A1 | 6/2011 | Marzetta et al. |
| 2012/0104999 | A1 | 5/2012 | Teggatz et al. |
| 2012/0175968 | A1 | 7/2012 | Katsunaga et al. |
| 2012/0228958 | A1 | 9/2012 | Rakhyani et al. |
| 2013/0026848 | A1 | 1/2013 | Ito ................................ 307/104 |
| 2014/0273835 | A1* | 9/2014 | Ghovanloo .......... H04B 5/0037 455/41.1 |

OTHER PUBLICATIONS

S. Abdollah Mirbozorgi et al., "A Full-Duplex Wireless Integrated Transceiver for Implant-to-Air Data Communications", 2015 IEEE Custom Integrated Circuits Conference (CICC), Sep. 28-30, 2015, 4 pages, IEEE, San Jose, CA, USA.

S. A. Mirbozorgi et al., "A Low-Power 2.4-GHz Receiver for Wireless Implantable Neural Stimulators", 2014 IEEE International Symposium on Circuits and Systems (ISCAS), Jun. 1-5, 2014, pp. 1082-1085, IEEE, Melbourne VIC, Australia.

H. Sepehrian et al., "A Low-Power Current-Reuse Analog Front-End for Multi-Channel Neural Signal Recording", 2014 IEEE 12th International New Circuits and Systems Conference (NEWCAS), Jun. 22-25, 2014, pp. 440-443, IEEE, Trois-Rivieres, QC, Canada.

Mohammad Salahshoor et al., "A New Discriminator for a Low-Power Capacitor-Less FSK Demodulator for Biomedical Implants", 2012 IEEE 10th International New Circuits and Systems Conference (NEWCAS), Jun. 17-20, 2012, pp. 297-300, IEEE, Montreal, QC, Canada.

Masoume Akbari et al., "A New Rail-to-Rail Ultra Low Voltage High Speed Comparator", 2013 21st Iranian Conference on Electrical Engineering (ICEE), May 14-16, 2013, 6 pages, IEEE, Mashhad, Iran.

M. Rezaei et al., "A Short-Impulse UWB BPSK Transmitter for Large-Scale Neural Recording Implants", 2016 IEEE 38th Annual International Conference of the Engineering in Medicine and Biology Society (EMBC), Aug. 16-20, 2016, pp. 6315-6318, IEEE, Orlando, FL, USA.

S. Abdollah Mirbozorgi et al., "A Single-Chip Full-Duplex High Speed Transceiver for Multi-Site Stimulating and Recording Neural Implants", IEEE Transactions on Biomedical Circuits and Systems, Jun. 2016, pp. 643-653, vol. 10, No. 3, IEEE.

S. Abdollah Mirbozorgi et al., "A Smart Cage With Uniform Wireless power Distribution in 3D for Enabling Long-Term Experiments With Freely Moving Animals", IEEE Transactions on Biomedical Circuits and Systems, Apr. 2016, pp. 424-434, vol. 10, No. 2, IEEE.

S. A. Mirbozorgi et al., "A Smart Multicoil Inductively Coupled Array for Wireless Power Transmission", IEEE Transactions on Industrial Electronics, Nov. 2014, pp. 6061-6070, vol. 61, No. 11, IEEE.

S. A. Mirbozorgi et al., "A Smart Multi-Receiver Power Transmission System for Long-term Biological Monitoring", 2014 IEEE Biomedical Circuits and Systems Conference (BioCAS), Oct. 22-24, 2014, pp. 1-4, IEEE, Lausanne, Switzerland.

S. A. Mirbozorgi et al., "A transcutaneous Power Transfer Interface Based on a Multicoil Inductive Link", 34th Annual International Conference of the IEEE EMBS, Aug. 28-Sep. 1, 2012, pp. 1659-1662, IEEE, San Diego, California USA.

Reza Ameli et al., "A Wireless and Batteryless Neural Headstage with Optical Stimulation and Electrophysiological Recording", 35th , Annual International Conference of the IEEE EMBS Jul. 3-7, 2013, pp. 5662-5665, IEEE, Osaka, Japan.

Yaoyao Jia et al., "A Wirelessly-Powered Homecage with Animal behavior Analysis and Closed-Loop Power Control", 2016 IEEE 38th Annual International Conference of the Engineering in Medicine and Biology Society (EMBC), Aug. 16-20, 2016, pp. 6323-6326, IEEE, Orlando, FL, USA.

S. Abdollah Mirbozorgi et al., "A Wirelessly-Powered Homecage With Segmented Copper Foils and Closed-Loop Power Control", IEEE Transactions on Biomedical Circuits and Systems, Oct. 2016, pp. 979-989, vol. 10, No. 5, IEEE.

H. Bahrami et al., "BER Performance of Implant-to-Air High Speed UWB Data Communications for Neural Recording Systems", 2014 36th Annual International Conference of the IEEE Engineering in Medicine and Biology Society (EMBC), Aug. 26-30, 2014, pp. 3961-3964, IEEE, Chicago, IL, USA.

Hadi Bahrami et al., "Biological Channel Modeling and Implantable UWB Antenna Design form Neural Recording Systems", IEEE Transactions on Biomedical Engineering, Jan. 2015, pp. 88-98, vol. 62, No. 2, IEEE.

S. A. Mirbozorgi et al., "Duty Cycle Shift Keying Data Transfer Technique for Bio-Implantable Devices", 2011 IEEE International Symposium on Circuits and Systems (ISCAS), May 15-18, 2011, pp. 917-920, IEEE, Rio de Janeiro, Brazil.

Hadi Bahrami et al., "Flexible, Polarization-Diverse UWB Antennas for Implantable Neural Recording Systems", IEEE Transactions on Biomedical Circuits and Systems, Feb. 2016, pp. 38-48, vol. 10, No. 1, IEEE.

Hadi Bahrami et al., "Integrated UWB Transmitter and Antenna Design for Interfacing High-Density Brain Microprobes", 2015 IEEE International Conference on Ubiquitous Wireless Broadband (ICUWB), Oct. 4-7, 2015, 5 pages, IEEE, Montreal, QC, Canada.

Yaoyao Jia et al., "Live Demonstration: A Smart Homecage System with Behavior Analysis and Closed-Loop Optogenetic Stimulation Capabilities", 2015 IEEE Biomedical Circuits and Systems Conference (BioCAS), Oct. 22-24, 2015, 1 page, IEEE, Atlanta, GA, USA.

S. A. Mirbozorgi et al., "Multicoil Resonance-Based Parallel Array for Smart Wireless Power Delivery", 35th Annual International Conference of the IEEE EMBS, Jul. 3-7, 2013, pp. 751-754, IEEE, Osaka, Japan.

Pyungwoo Yeon et al., "Optimal Design of a 3-Coil Inductive Link for Millimeter-Sized Biomedical Implants", 2016 IEEE Biomedical Circuits and Systems Conference (BioCAS), Oct. 17-19, 2016, pp. 396-399, IEEE, Shanghai, China.

Yaoyao Jia et al., "Position and Orientation Insensitive Wireless Power Transmission for EnerCage-Homecage System", IEEE Transactions on Biomedical Engineering, Apr. 7, 2017, pp. 1-10, IEEE.

S. Abdollah Mirbozorgi et al., "Robust Wireless Power Transmission to mm-Sized Free-Floating Distributed Implants", IEEE Transactions on Biomedical Circuits and Systems, Jun. 2017, pp. 692-702, vol. 11, No. 3, IEEE.

Hadi Bahrami et al., "System-Level Design of a Full-Duplex Wireless Transceiver for Brain-Machine Interfaces", IEEE Transactions on Microwave Theory and Techniques, Oct. 2016, pp. 3332-3341, vol. 64, No. 10, IEEE.

Pyungwoo Yeon et al., "Toward a Distributed Free-Floating Wireless Implantable Neural Recording System", 2016 IEEE 38th Annual International Conference of the Engineering in Medicine and Biology Society (EMBC), Aug. 16-20, 2016, pp. 4495-4498, IEEE, Orlando, FL, USA.

Zheyuan Wang et al., "Towards a Kinect-Based Behavior Recognition and Analysis System for Small Animals", 2015 IEEE Biomedical Circuits and Systems Conference (BioCAS), Oct. 22-24, 2015, 4 pages, IEEE, Atlanta, GA, USA.

(56) References Cited

OTHER PUBLICATIONS

S. A. Mirbozorgi et al., "Towards a Wireless Optical Stimulation System for Long Term In-Vivo Experiments", 2014 36th Annual International Conference of the IEEE Engineering in Medicine and Biology Society (EMBC), Aug. 26-30, 2014, pp. 2024-2027, IEEE, Chicago, IL, USA.

Chintan Buch et al., "Ultra-Thin Wireless Power Module with Integration of Wireless Inductive Link and Supercapacitors", 2016 IEEE 66th Electronic Components and Technology Conference (ECTC), May 31-Jun. 3, 2016, pp. 2364-2371, IEEE, Las Vegas, NV, USA.

International Search Report for Application No. PCT/IB2014/062595, dated Oct. 20, 2014, 3 pp.

Written Opinion for Application No. PCT/IB214/062595, dated Oct. 20, 2014, 5 pp.

H.G. Lim et al., "A method for reducing body exposure to electromagnetic field of pillow type wireless charger in fully implantable middle ear hearing device", IEICE Electronics Express, Sep. 25, 2009, pp. 1318-1324, vol. 6., No. 18, IEICE, 2009.

André Kurs et al., "Wireless Power Transfer via Strongly Coupled Magnetic Resonances", Science, Jul. 6, 2007, pp. 83-86, vol. 317, wwwsciencemag.org.

P. Vaillancourt et al., "EM Radiation Behavior upon Biological Tissues in a Radio-Frequency Power Transfer Link for a Cortical Visual Implant", Proceedings 19th International Conference—IEEE/EMBS, Oct. 30-Nov. 2, 1997, pp. 2499-2502, IEEE, Chicago, IL. USA.

Koichi Hatanaka et al., "Power Transmission of a Desk With Cord-Free Power Supply", IEEE Transactions on Magnetics, Sep. 2002, pp. 3329-3331, vol. 38, No. 5, IEEE.

Shizhong Mei et al., "Modeling Skin and Proximity Effects With Reduced Realizable RL Circuits", IEEE Transactions on Very Large Scale Integration (VLSI) Systems, Apr. 2004, pp. 437-447, vol. 12, No. 4, IEEE.

S.Y.R. Hui et al., "A New Generation of Universal Contactless Battery Charging Platform for Portable Consumer Electronic Equipment", IEEE Transactions on Power Electronics, May 2005, pp. 620-627, vol. 20, No. 3, IEEE.

Nattapon Chaimanonart et al., "Implantable RF Power Converter for Small Animal In Vivo Biological Monitoring", Proceedings of the 2005 IEEE, Engineering in Medicine and Biology 27th Annual Conference, Sep. 1-4, 2005, pp. 5194-5197, IEEE, Shanghai, China.

Michael W. Baker et al., "Feedback Analysis and Design of RF Power Links for Low-Power Bionic Systems", IEEE Transactions on Biomedical Circuits and Systems, Mar. 2007, pp. 28-38, vol. 1, No. 1, IEEE.

Reid R. Harrison, "Designing Efficient Inductive Power Links for Implantable Devices", IEEE International Symposium on Circuits and Systems, May 27-30, 2007, pp. 2080-2083, IEEE, New Orleans, LA. USA.

Daniel McCormick et al., "Powering Implantable Telemetry Devices from Localized Magnetic Fields", Proceedings of the 29th Annual International Conference of the IEEE EMBS, Aug. 23-26, pp. 2331-2335, IEEE, Lyon, France.

Xun Liu et al., "Simulation Study and Experimental Verification of a Universal Contactless Battery Charging Platform With Localized Charging Features", IEEE Transactions on Power Electronics, Nov. 2007, pp. 2202-2210, vol. 22, No. 6, IEEE.

Peng Cong et al., "Novel Long-Term Implantable Blood Pressure Monitoring System with Reduced Baseline Drift", Proceedings of the 28th IEEE EMBS Annual International Conference, Aug. 30-Sep. 3, 2006, pp. 1854-1857, IEEE, New York, USA.

Mark D. Zimmerman et al., "In Vivo RF Powering for Advanced Biological Research", Proceedings of the 28th IEEE EMBS Annual International Conference, Aug. 30-Sep. 3, 2006, pp. 2506-2509, IEEE, New York, USA.

Jaron Achterberg et al., "Coil Array Structures Compared for Contactless Battery Charging Platform", IEEE Transactions on Magnetics, May 2008, pp. 617-622, vol. 44, No. 5, IEEE.

Nattapon Chaimanonart et al., "Adaptive RF Power Control for Wireless Implantable Bio-Sensing Network to Monitor Untethered Laboratory Animal Real-Time Biological Signals", IEEE Sensors 2008 Conference, Oct. 26-29, 2008, pp. 1241-1244, IEEE, Lecce, Italy.

Benoit Gosselin et al., "A Mixed-Signal Multichip Neural Recording Interface With Bandwidth Reduction", IEEE Transactions on Biomedical Circuits and Systems, Jun. 2009, pp. 129-141, vol. 3, No. 3, IEEE.

Joaquin J. Casanova et al., "Transmitting Coil Achieving Uniform Magnetic Field Distribution for Planar Wireless Power Transfer System", Radio and Wireless Symposium, 2009. RWS '09. IEEE, Jan. 18-22, 2009, pp. 530-533, IEEE, San Diego, CA, USA.

Reid R. Harrison et al., "Wireless Neural Recording With Single Low-Power Integrated Circuit", IEEE Transactions on Neural Systems and Rehabilitation Engineering, Aug. 2009, pp. 322-329, vol. 17, No. 4, IEEE.

Joaquin J. Casanova, "A Loosely Coupled Planar Wireless Power System for Multiple Receivers", IEEE Transactions on Industrial Electronics, Aug. 2009, pp. 3060-3068, vol. 56, No. 8, IEEE.

Benjamin L. Cannon et al., "Magnetic Resonant Coupling As a Potential Means for Wireless Power Transfer to Multiple Small Receivers", IEEE Transactions on Power Electronics, Jul. 2009, pp. 1819-1825, vol. 24, No. 7, IEEE.

Uei-Ming Jow et al., "Modeling and Optimization of Printed Spiral Coils in Air, Saline, and Muscle Tissue Environments", IEEE Transactions on Biomedical Circuits and Systems, Oct. 2009, pp. 339-347, vol. 3, No. 5, IEEE.

Eberhard Waffenschmidt et al., "Limitation of Inductive Power Transfer for Consumer Applications", 13th European Conference on Power Electronics and Applications, 2009. EPE '09, Sep. 8-10, 2009, 10 pages, IEEE, Barcelona, Spain.

David Russell et al., "Wireless Power Delivery System for Mouse Telemeter", Biomedical Circuits and Systems (BioCAS) Conference, Nov. 26-28, 2009, pp. 273-276, IEEE, Beijing, China.

Alanson P. Sample et al., "Analysis, Experimental Results, and Range Adaptation of Magnetically Coupled Resonators for Wireless Power Transfer", IEEE Transactions on Industrial Electronics, Feb. 2011, pp. 544-554, vol. 58, No. 2, IEEE.

Mehdi Kiani et al., "An RFID-Based Closed-Loop Wireless Power Transmission for Biomedical Applications", IEEE Transactions on Circuits and Systems-II: Express Briefs, Apr. 2010, pp. 260-264, vol. 57, No. 4, IEEE.

Anil Kumar Ramrakhyani et al., "Design and Optimization of Resonance-Based Efficient Wireless Power Delivery Systems for Biomedical Implants", IEEE Transactions on Biomedical Circuits and Systems, Feb. 2011, pp. 48-63, vol. 5, No. 1, IEEE.

Seung Bae Lee et al., "An Inductively Powered Scalable 32-Channel Wireless Neural Recording System-on-a-Chip for Neuroscience Applications", IEEE Transactions on Biomedical Circuits and Systems, Dec. 2010, pp. 360-371, vol. 4, No. 6, IEEE.

W.X. Zhong et al, "A Novel Single-Layer Winding Array and Receiver Coil Structure for Contactless Battery Charging Systems With Free-Positioning and Localized Charging Features", IEEE Transactions on Industrial Electronics, Sep. 2011, pp. 4136-4144, vol. 58, No. 9, IEEE.

Enver G. Kilinc et al., "Design and Optimization of Inductive Power Transmission for Implantable Sensor System", 2010 XI th International Workshop on Symbolic and Numerical Methods, Modeling and Applications to Circuit Design (SM2ACD), Oct. 4-6, 2010, 5 pages, IEEE, Gammarth, Tunisia.

Hung-Yu Shen et al., "Study of Contactless Inductive Charging Platform with Core Array Structure for Portable Products", 2011 International Conference on Consumer Electronics, Communications and Networks (CECNet), Apr. 16-18, 2011, pp. 756-759, IEEE, XianNing, China.

Mehdi Kiani et al., "Design and Optimization of a 3-Coil Inductive Link for Efficient Wireless Power Transmission", IEEE Transactions on Biomedical Circuits and Systems, Dec. 2011, pp. 579-591, vol. 5, No. 6, IEEE.

(56) References Cited

OTHER PUBLICATIONS

Diao Yinliang et al., "Design of Coil Structure Achieving Uniform Magnetic Field Distribution for Wireless Charging Platform", 2011 4th International Conference on Power Electronics Systems and Applications (PESA), Jun. 8-10, 2011, 5 pages, IEEE, Hong Kong, China.

Noriaki Oodachi et al., "Efficiency Improvement of Wireless Power Transfer Via Magnetic Resonance Using Transmission Coil Array", 2011 IEEE International Symposium on Antennas and Propagation (APSURSI), Jul. 8, 2011, pp. 1707-1710, IEEE, Spokane, WA, USA.

Hideaki Abe et al., "Equivalent Circuit of Wireless Power Transmission with Coil Array Structures", 2012 IEEE MTT-S International Microwave Workshop Series on Innovative Wireless Power Transmission: Technologies, Systems, and Applications (IMWS), May 10-11, 2012, pp. 115-118, IEEE, Kyoto, Japan.

Jinwook Kim et al., "Wireless Power Transfer for Free Positioning using Compact Planar Multiple Self-Resonators", 2012 IEEE MTT-S International Microwave Workshop Series on Innovative Wireless Power Transmission: Technologies, Systems, and Applications (IMWS), May 10-11, 2012, pp. 127-130, IEEE, Kyoto, Japan.

Uei-Ming Jow et al., "Towards a Smart Experimental Arena for Long-Term Electrophysiology Experiments", IEEE Transactions on Biomedical Circuits and Systems, Oct. 2012, pp. 414-423, vol. 6, No. 5, IEEE.

Jinsung Choi et al., "Design of High Efficiency Wireless Charging Pad based on Magnetic Resonance Coupling", Proceedings of the 42nd European Microwave Conference, Oct. 29-Nov. 1, 2012, pp. 916-919, EuMA, Amsterdam, The Netherlands.

Kim Ean Koh et al., "Impedance Matching and Power Division Using Impedance Inverter for Wireless Power Transfer via Magnetic Resonant Coupling", IEEE Transactions on Industry Applications, May/Jun. 2014, pp. 2061-2070, vol. 50, No. 3, IEEE.

IEEE, "IEEE Standard for Safety Levels with Respect to Human Exposure to Radio Frequency Electromagnetic Fields, 3 kHz to 300 GHz", IEEE Std C95.1™ -2005, Apr. 19, 2006, 250 pages, IEEE, New York, NY, USA.

Frequency Management, Regulatory Affairs and Spectrum Engineering Working Groups, "ERC Recommendation 70-03 (Tromsø 1997 and Subsequent Amendments) Relating to the Use of Short Range Devices (SRD)", Aug. 22, 2011, 60 pages, available on the internet at https://www.arcep.fr/fileadmin/reprise/dossiers/frequences/ERC-REC-70-03E-version02.PDF.

Wikipedia, "Qi (standard)", 4 pages, Available on the internet at https://en.wikipedia.org/wiki/Qi_(standard) at least from Jun. 16, 2017.

Electronic Communication Committee, "ERC Recommendation 70-03 Relating to the Use of Short Range Devices (SRD)", May 19, 2017, 84 pages, available on the internet at www.efis.dk/reports/ReportDownloader?reportid=2.

Klaus Finkenzeller, "RFID Handbook, Fundamental and Applications in Contactless Smart Cards, Radio Frequency Identification and Near-Field Communication", 2010, 480 pages, Third Edition, Wiley, Chippenham, Wiltshire, UK.

Benoit Gosselin, "Recent Advances in Neural Recording Microsystems", Sensors 2011, Apr. 27, 2011, pp. 4572-4597, vol. 11, Sensors, www.mdpi.com/journal/sensors.

* cited by examiner

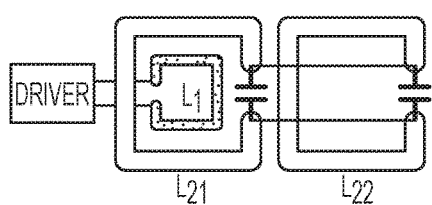 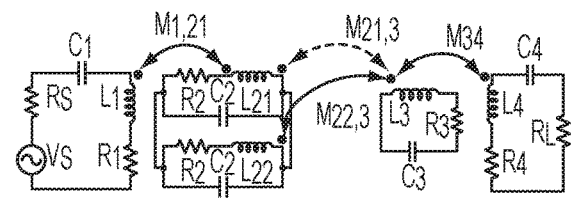
FIG. 3A  FIG. 3B
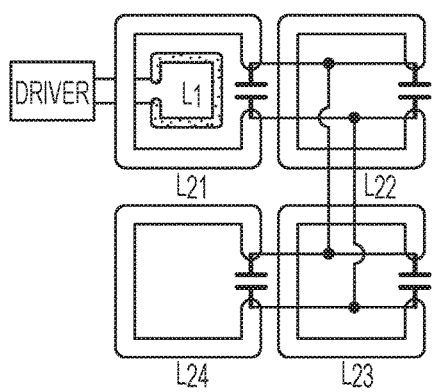 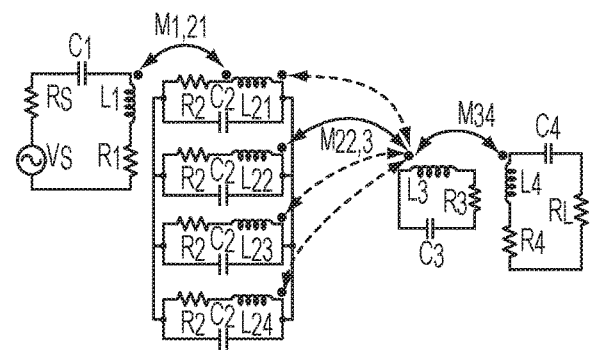
FIG. 3C  FIG. 3D

SPECIFICATIONS OF THE IMPLEMENTED SPIRAL COILS

| | SYMBOL/PARAMETER | $L_1$ | $L_{2i}$ | $L_3$ | $L_4$ | $L_{4W}$ |
|---|---|---|---|---|---|---|
| L | INDUCTANCE (μH) | 3.74 | 0.96 | 0.89 | 0.54 | 9.3 |
| R | PARASITIC RESISTANCE (Ω) | 0.4 | 0.05 | 0.15 | 0.77 | 0.1 |
| $d_o$ | OUTER DIAMETER (mm) | 70 | 150 | 41.5 | 10.5 | 54 |
| $d_i$ | INNER DIAMETER (mm) | 32.5 | 50 | 18 | 3 | 26 |
| w | LINE WIDTH (μm) | 2000 | 16000 | 2000 | 254 | N/A |
| s | LINE SPACING (μm) | 380 | 1000 | 380 | 254 | N/A |
| N | NUMBER OF TURNS (N) | 8 | 3 | 5 | 8 | 14 |
| | TYPE OF COIL | PRINTED | PRINTED | PRINTED | PRINTED | WIRE WOUND |

FIG. 10

COIL COUPLING COEFFICIENTS AND MUTUAL INDUCTANCES AT 13.56 MHz

| SYMBOL | $L_1, L_{2i}$ | $L_{2i}, L_3$ | $L_3, L_4$ | $L_1, L_3$ | $L_1, L_4$ | $L_2, L_4$ |
|---|---|---|---|---|---|---|
| $K_{i,j}$ | 0.2 | 0.056 | 0.15 | 0.025 | 0.003 | 0.0056 |
| $M_{i,j}$ (μH) | 0.379 | 0.051 | 0.104 | 0.045 | 0.004 | 0.004 |
| $D_{i,j}$ (mm) | 5 | 40 | 2 | 45 | 47 | 42 |

FIG. 11

SPECIFICATIONS OF THE IMPLEMENTED SPIRAL COILS

| PARAMETER | $L_1$ | $L_{2i}$ | $L_3$ | $L_4$ |
|---|---|---|---|---|
| INDUCTANCE, L (μH) | 3.74 | 1.68 | 0.8 | 3.4 |
| PARASITIC RESISTANCE, R (Ω) | 0.4 | 0.05 | 0.03 | 0.2 |
| OUTER DIAMETER, $d_o$ (mm) | 70 | 135 | 44 | 29 |
| INNER DIAMETER, $d_i$ (mm) | 32.5 | 47 | 42 | 28 |
| LINE WIDTH, W (mm) | 2 | 10 | 0.5 | 0.25 |
| LINE SPACING, S (μm) | 380 | 1000 | 20 | 20 |
| NUMBER OF TURNS (N) | 8 | 3 | 3 | 8 |
| TYPE OF COIL | PRINTED | PRINTED | WIRE WOUND | WIRE WOUND |

SPECIFICATIONS OF THE PROPOSED POWER SYSTEMS

| PARAMETERS | 2D SURFACE | 3D CHAMBER |
|---|---|---|
| NUMBER OF COILS IN ARRAY | 9 | 18 |
| TYPE OF INDUCTIVE LINK | 4-COIL | 4-COIL |
| RESONANCE FREQUENCY | 13.56 MHz | 13.56 MHz |
| SIZE OF THE CHAMBER | $27*27$ cm$^2$ | $27*27*16$ cm$^3$ |
| EFFECTIVE AREA/VOLUME | $22.5*22.5$ cm$^2$ | $22.5*22.5*14$ cm$^3$ |
| MAXIMUM PDL VARIATION | 10% (±0.2 dB) | 6% (±0.1 dB) |
| TRANSMISSION COEFFICIENT | -10 dB | -12 dB |
| POWER TRANSFER EFFICIENCY | 69% (d=4cm) | 59% |
| FOM (PTE × PDL × d/d$_{OR}$) | 7.88 | 21 |
| NUMBER OF CONDUCTIVE LAYERS | 4 PARALLEL LAYERS | 4 PARALLEL LAYERS FOR EACH SURFACE |
| TYPES OF TRANSMITTER COILS | PRINTED/SQUARE | PRINTED/SQUARE |

FIG. 21

SMART MULTICOIL INDUCTIVELY-COUPLED ARRAY FOR WIRELESS POWER TRANSMISSION

TECHNICAL FIELD

The invention relates to wireless power transmission and more particularly to a multicoil inductively-coupled array.

BACKGROUND OF THE ART

Nowadays power transmission systems based on inductive coupling are becoming increasingly popular to charge a wide variety of battery powered devices, ranging from handheld electronics, such as cell phones, tablets and computer mouses, to electric vehicles. Key characteristics for such systems are ease of use, high energy transfer efficiency, short charging time and low-cost.

On the other hand, there are several applications in which an electronic device cannot use batteries as a primary source of energy. Implantable devices and smart animal research systems are examples of such applications. In these systems, power is delivered wirelessly in air or across the skin through an inductive link formed by mutually coupled coils to limit risks of infection and any dangerous tethering associated with transcutaneous wires.

Increasing power transfer efficiency (PTE) and improving robustness of such links contribute to the development of several useful applications, such as various types of battery-less microsensors.

Multicoil topologies, for example, three-coil and four-coil topologies, have recently demonstrated higher PTE over longer separation distances. Moreover, multicoil structures are known to provide more degrees of freedom, and can compensate for effects of low coil coupling coefficient (k), and low coil quality factor (Q), which greatly facilitates optimization of the power link. Additionally, multicoil links provide better immunity to variation of the operating frequency.

However, it is established that achieving excellent PTE and high power delivered to the load (PDL) commands the size of the Transmit (TX) coil to be determined based on the size of the Receive (RX) coil and a set of rules. Therefore, arrays including several unit size TX coils have been utilized to transmit power and provide free positioning to a smaller RX coil, without compromising PTE and PDL. Such power transmission arrays have used different types of coil arrangements, including structures made of an array of several individual 2-coil overlapping inductive links to provide a uniform electromagnetic field above a surface, and resonance-based arrays made of several non-overlapping floating coils. In the latter array structure, magnetic coupling propagates all along the array through adjacent coils.

Different techniques have been used to avoid driving every coil of an array at the same time to save power as well as to increase PTE. A magnetic sensor can be used to detect the location of a small magnet enclosed with the receiver. Then, a dedicated control system activates the subset of coils that encompasses the detected magnet to power up the device attached to the receiver. Frequency selection can be employed to localize transmitted power through a subset of active coils towards the receiver. Thus, each coil of the array is tuned to a different resonance frequency, which is challenging to implement and yields limited efficiency, since the resonance frequency on the RX side is fixed and cannot track the selected frequency on the TX side.

SUMMARY

A novel resonance-based multicoil structure to wirelessly charge or power up an apparatus with high efficiency and free positioning capability in 2D and 3D is presented. The proposed structure consists of a novel multicoil inductive link, which primary resonator is made of several identical coil elements connected in parallel, and arranged in an array. Such an array presents several key features that benefit the design and the implementation of power transmission surfaces and chambers to deliver nearly constant power in 2D and 3D.

The proposed approach 1) can deliver power with superior efficiency over longer separation distances without the need for a closed loop power management unit, 2) can naturally track the receiver position and localize transmitted power through nearby coil array elements without the need for complex control and detection circuitry, and 3) can accommodate either short range or long range power transmission applications, simply by slightly modifying the receiver topology. Such characteristics provide superior power, size and/or cost efficiency compared to other solutions.

According to one broad aspect of the present invention, there is provided a power transmission system for wirelessly charging a power storage unit. The system comprises a power driver circuit; a wireless power transmitter (TX) having a transmitter primary inductive unit (L1) coupled to the power driver circuit and configured to generate an alternating magnetic field; a transmitter primary resonator (L2) receiving electrical power from the transmitter primary inductive unit (L1) by electromagnetic induction, the transmitter primary resonator (L2) including n substantially identical inductive elements electrically connected in parallel to form an array, a subset m of the n substantially identical inductive elements being in mutual inductance with the transmitter primary inductive unit; a wireless power receiver (RX) having a receiver secondary inductive unit (L4) for receiving electric power by magnetic field resonance, wherein the wireless power transmitter (TX) and the wireless power receiver (RX) are tuned to a same resonance frequency; a power storage unit electrically connected to and being supplied by the wireless power receiver (RX).

In one embodiment, the wireless power receiver (RX) further comprises a receiver secondary resonator (L3), wherein the transmitter primary resonator (L2) and the receiver secondary resonator (L3) are in mutual inductance.

According to another broad aspect of the present invention, there is provided a power surface or chamber having nearly constant electromagnetic field distribution in 3D comprising: at least one primary coil and one primary resonance array made of several coils connected in parallel for generating the electromagnetic field distribution; a single power driver circuit for activating the coils; and a secondary coil and an optional secondary resonance coil to recover the generated electromagnetic field and power up an electric device.

According to another broad aspect of the present invention, there is provided a power transmission system for wirelessly charging a load comprising: a power driver circuit; a wireless power transmitter having: a transmitter primary inductive unit coupled to the power driver circuit and configured to generate an alternating magnetic field; a transmitter primary resonator receiving electrical power from the transmitter primary inductive unit by electromagnetic induction, the transmitter primary resonator including n inductive elements electrically connected in parallel to form an array, a subset m of the n inductive elements being in mutual inductance with the transmitter primary inductive unit; a wireless power receiver having: a receiver secondary inductive unit for receiving electric power by magnetic field resonance; a load electrically connected to and being supplied by the wireless power receiver; wherein the wireless power transmitter and the wireless power receiver are in mutual inductance.

In one embodiment, the wireless power receiver further comprises a receiver secondary resonator in mutual inductance with the receiver secondary inductive unit.

In one embodiment, the inductive element is a coil.

In one embodiment, the array of n inductive elements forms a power surface.

In one embodiment, two arrays of n inductive elements are provided facing one another at a distance from one another to form a power chamber.

In one embodiment, at least two of the n inductive elements overlap.

In one embodiment, the transmitter primary resonator further includes groups of inductive elements electrically connected in parallel to form parallel groups of arrays.

In one embodiment, the load is a power storage unit.

In one embodiment, the inductive elements of the transmitter primary resonator have matching electrical characteristics.

In one embodiment, the inductive elements of the transmitter primary resonator are tuned to a same resonance frequency.

In one embodiment, the wireless power transmitter and the wireless power receiver are tuned to a same resonance frequency.

According to yet another broad aspect of the present invention, there is provided a power transmission system having nearly constant electromagnetic field distribution in 3D comprising: at least one primary coil and one primary resonance array made of several coils connected in parallel for generating the electromagnetic field distribution; a power driver circuit for activating the coils; and a secondary coil to recover the generated electromagnetic field and power up an electric device.

In one embodiment, the power transmission system is one of a power surface and a power chamber.

In one embodiment, the power transmission system further includes a secondary resonance coil.

BRIEF DESCRIPTION OF THE DRAWINGS

Having thus generally described the nature of the invention, reference will now be made to the accompanying drawings, showing by way of illustration a preferred embodiment thereof and in which:

FIG. 2 includes FIG. 2A and FIG. 2B and shows the proposed inductive array principle.

FIG. 3 includes FIG. 3A, FIG. 3B, FIG. 3C and FIG. 3D in which FIG. 3A shows a parallel multicoil array including 2 parallel coil elements ($L_{21}$, and $L_{22}$) and its circuit representation is shown in FIG. 3B, FIG. 3C shows a parallel multicoil array including 4 parallel coil elements for $L_{2i}, 1 \leq i \leq 4$ and its circuit representation is shown in FIG. 3D;

FIG. 8 includes FIG. 8A and FIG. 8B in which

FIG. 9 includes FIG. 9A and FIG. 9B which are graphs of simulation and measurement results showing the adaptive behavior of the coil array.

FIG. 10 contains a table which shows specifications of the implemented spiral coils;

FIG. 11 contains a Table which shows coil coupling coefficients and mutual inductances at 13.56 MHz;

FIG. 13 includes FIG. 13A, FIG. 13B, FIG. 13C, FIG. 13D and FIG. 13E in which

FIG. 14 includes FIG. 14A and FIG. 14B in which

Figure 14A:
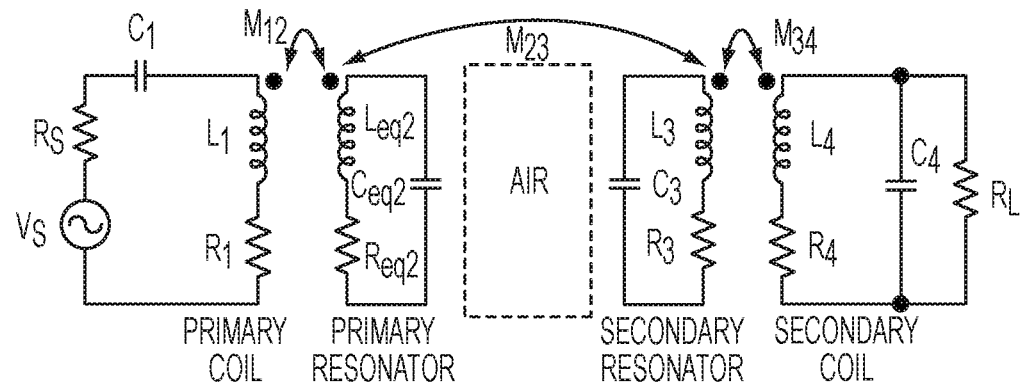
FIG. 14A shows a schematic of a 4-coil inductive link including two resonator coils (primary and secondary resonator) in addition to a primary and a secondary coil, in which the primary resonator includes several coils in parallel, and FIG.
Figure 15A:
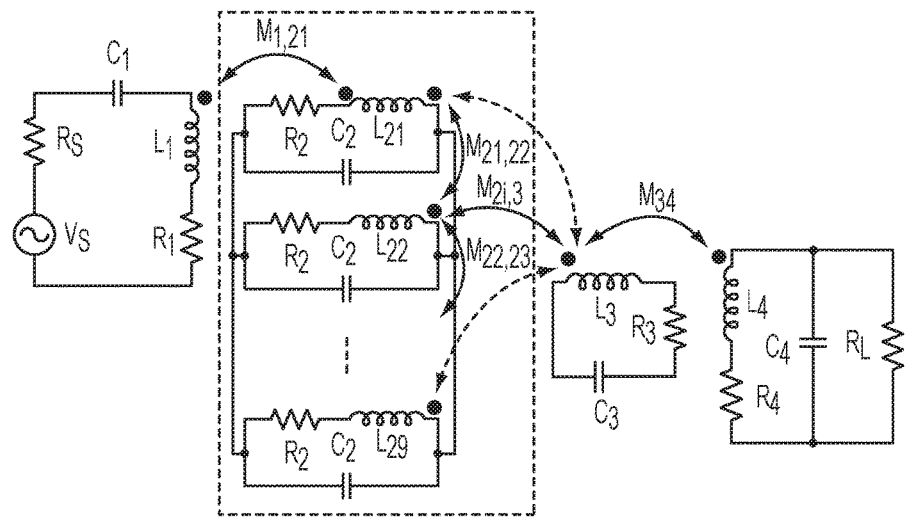
Figure 15B:
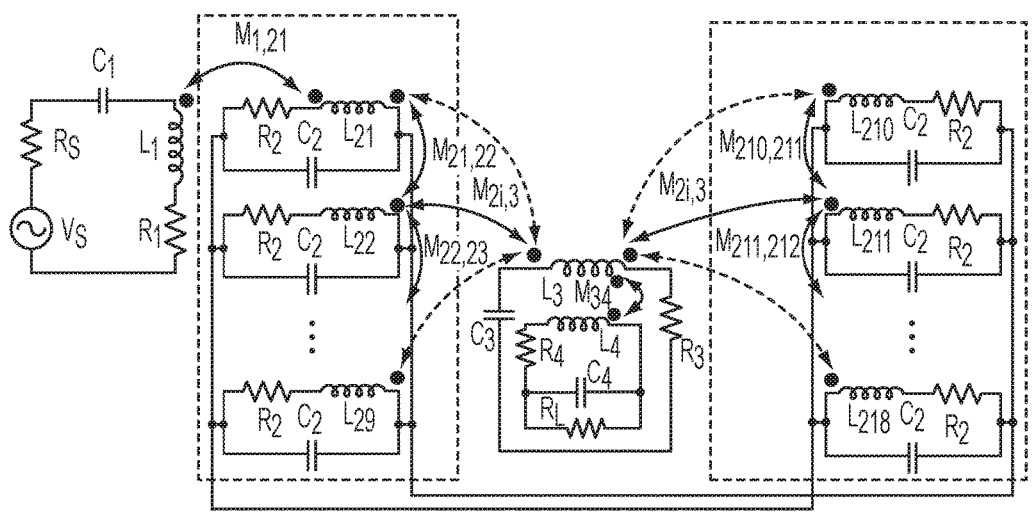
Figure 16A:
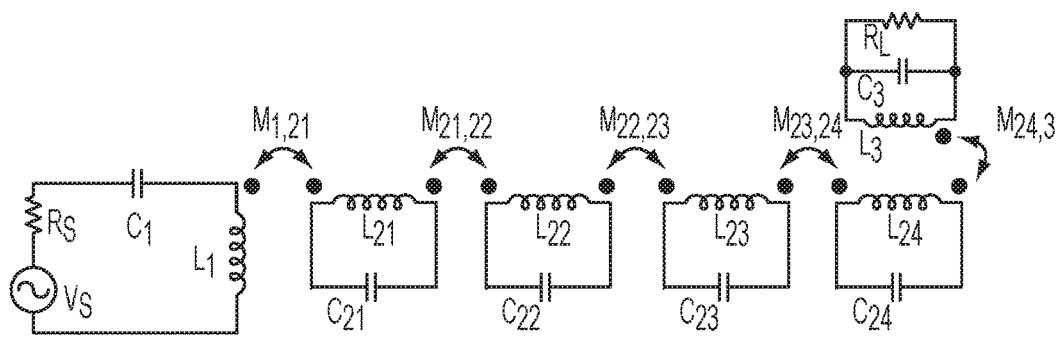
Figure 16B:
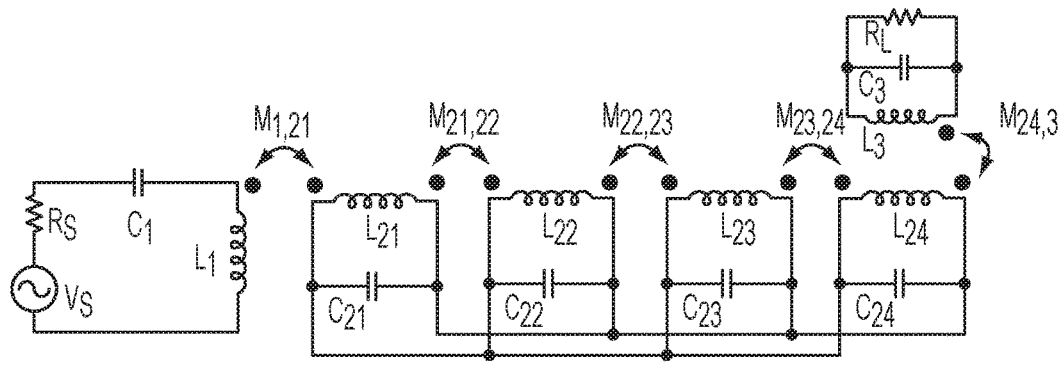
Figures 17, 18:
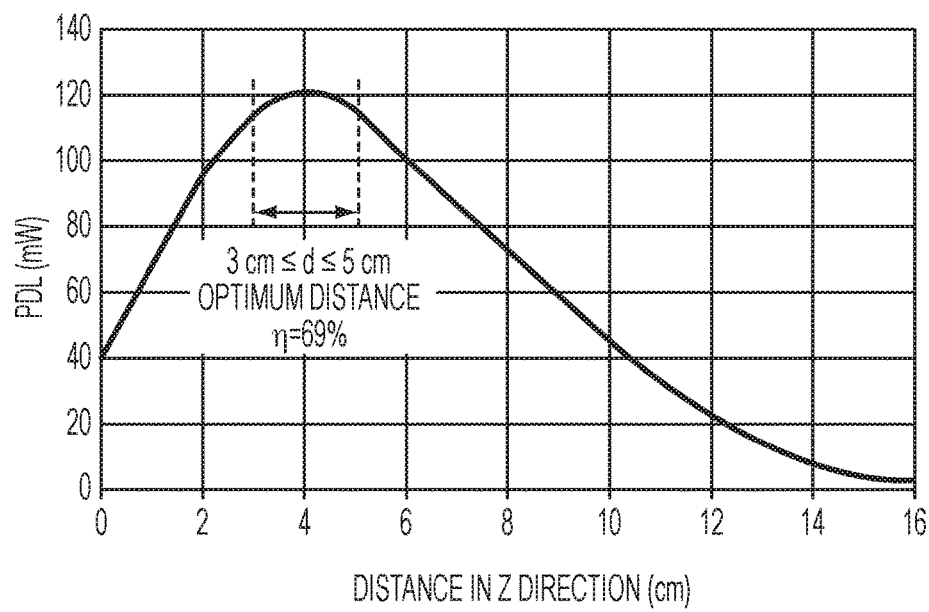
Figure 19A:
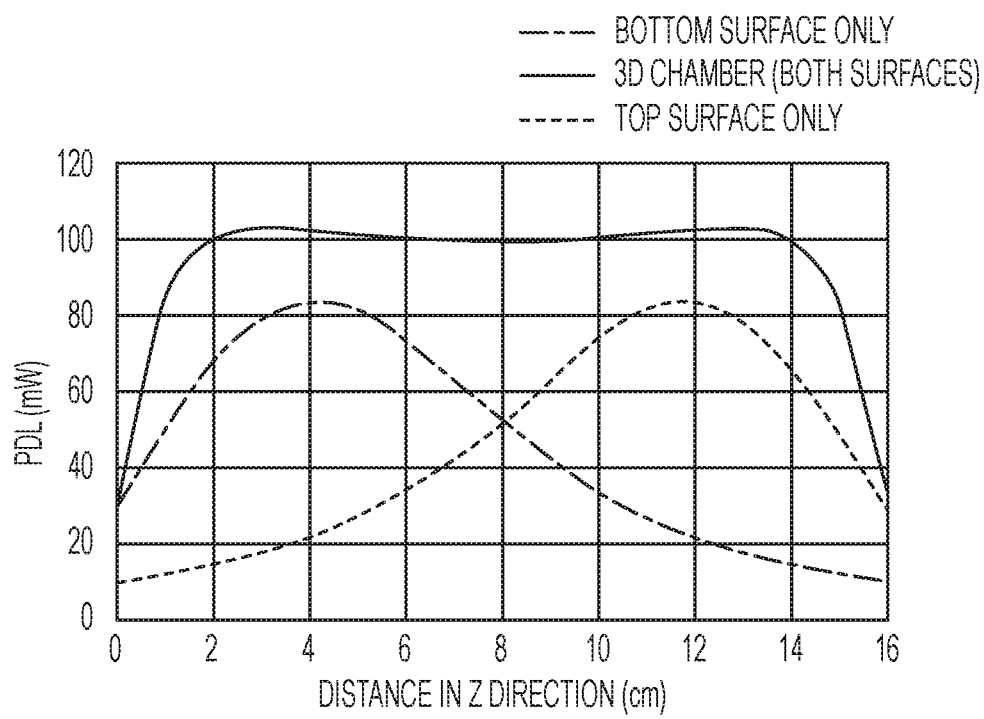
Figure 19B:
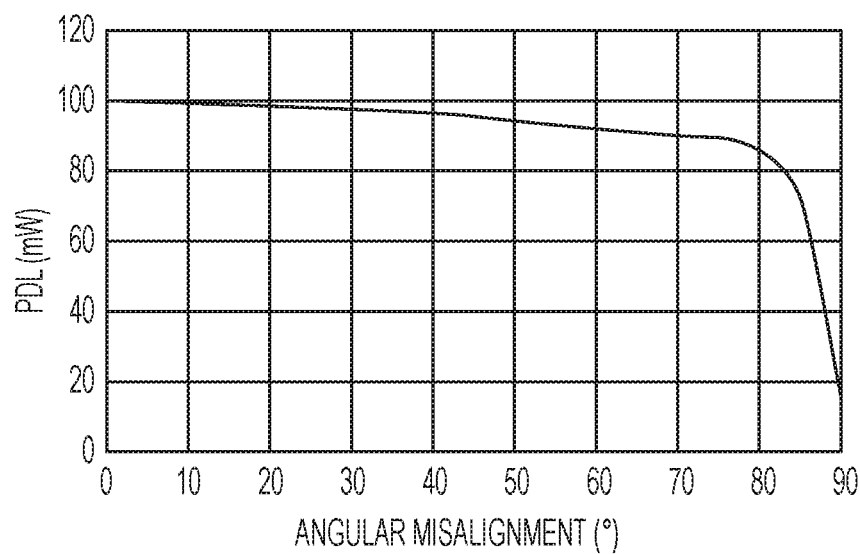
Figure 20:
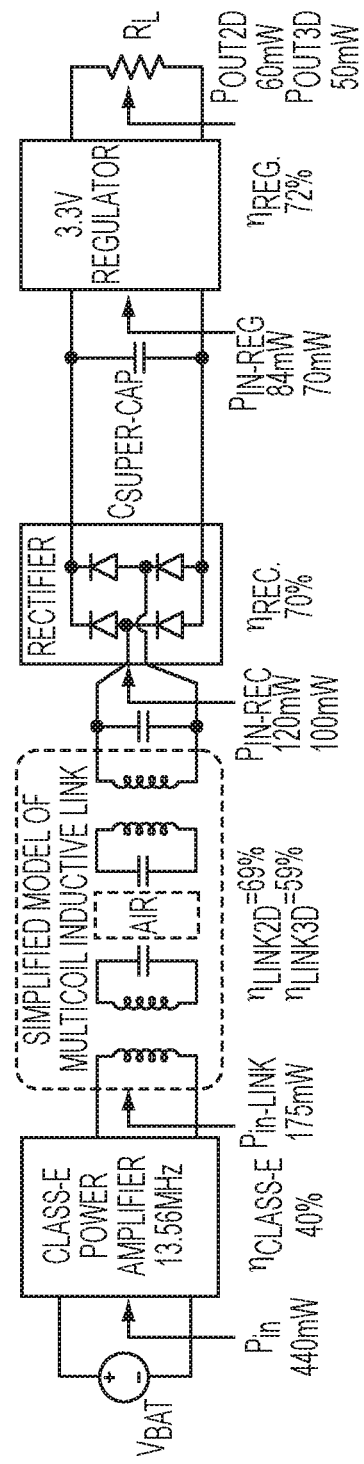

14B shows an example block diagram of the uniform 3D power transmission approach which includes a power source, a primary coil, two secondary resonance coil arrays (L2i, i=1, 2, ..., 18) connected in parallel, a secondary resonator, a secondary coil, and a load resistor (modeled as $R_L$), based on the 4-coil inductive link of FIG. 14A;

FIG. 15 includes FIG. 15A and FIG. 15B in which FIG. 15A shows an equivalent circuit model of the parallel multicoil array including 9 parallel coil elements L2i, 1≤i≤9 for the 2D approach, and FIG. 15B shows the equivalent circuit model of the parallel multicoil array including 18 parallel coil elements, L2i, 1≤i≤18, separated into two paralleled surfaces, each including 9 coil elements, for the 3D approach;

FIG. 16 includes FIG. 16A (Prior Art) and FIG. 16B which show the equivalent circuit models of 3-coil inductive links in which the primary resonator includes several coils arranged in a float structure (Prior Art) in FIG. 16A and in a parallel structure in FIG. 16B;

FIG. 17 presents a table of the specifications of the coils used in an example embodiment;

FIG. 18 shows the PDL of the power surface as a function distance in z direction (d) in the example embodiment of FIG. 17;

FIG. 19 includes FIG. 19A and FIG. 19B in which FIG. 19A is a graph of the measured power delivered to the load along z axis (d) when both power surfaces are placed at the bottom/top and when one surfaces is at the top and the other is at the bottom of the cage (proposed 3D configuration), and FIG. 19B is a graph of the power delivered to load as a function of receiver angular misalignment, for the 3D power chamber prototype ($R_L$=100Ω);

FIG. 20 is an example block diagram of the power transmission system which includes the following components: Class E power amplifier, inductive link (2D (d=4 cm) and 3D), rectifier, super capacitor, regulator and end load, the power input and the PTE of each block are indicated;

FIG. 21 is a table of the specifications of the example block diagram of FIG. 20;

DETAILED DESCRIPTION

An inductive power transmission system which achieves nearly constant power delivery with high efficiency above a surface is proposed. The proposed system can either optimally accommodate long range applications, like smart monitoring systems for animal research, when in a four-coil configuration, or short range applications, like charging handheld electronic devices, when in a three-coil configuration. The prototype can switch between both transmission ranges simply by changing the receiver topology. The proposed system naturally localizes the transmitted power towards the receiver location to save energy.

Figure 1:
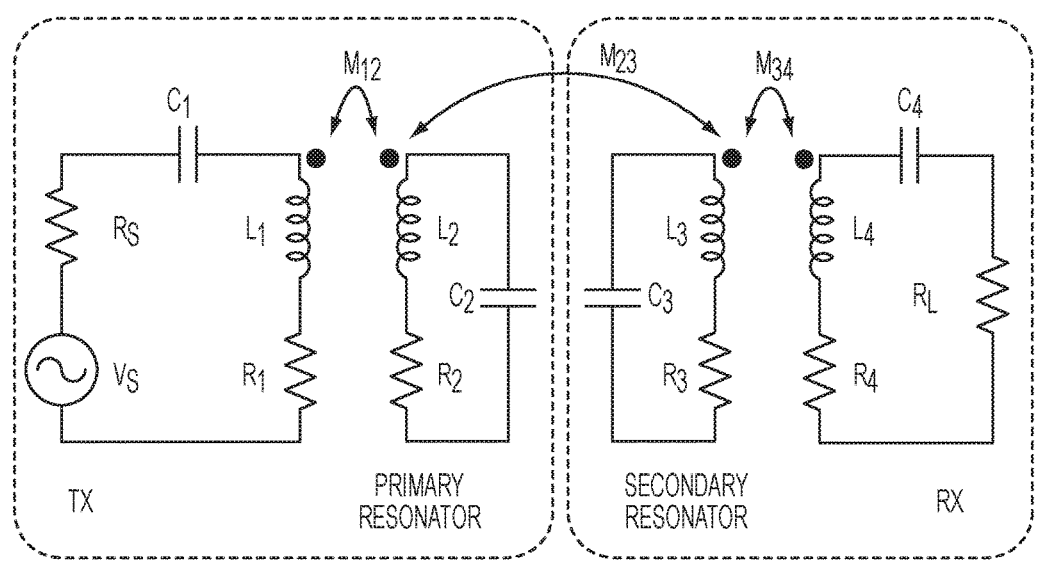
FIG. 1 (prior art) is a representation of a conventional multicoil inductive link circuit.

FIG. 1 (prior art) presents a conventional four-coil inductive link. In this structure, the transmitter (TX) is composed of one primary coil ($L_1$) and one primary resonance coil ($L_2$), while the receiver (RX) is composed of one secondary resonance coil ($L_3$) and one secondary coil ($L_4$). The resonators are tuned to a same resonance frequency. A three-coil configuration can be obtained by removing one resonance coil either in the TX (for example, by removing the primary resonance coil) or in the RX (for example, by removing the secondary resonance coil).

Figure 2A:
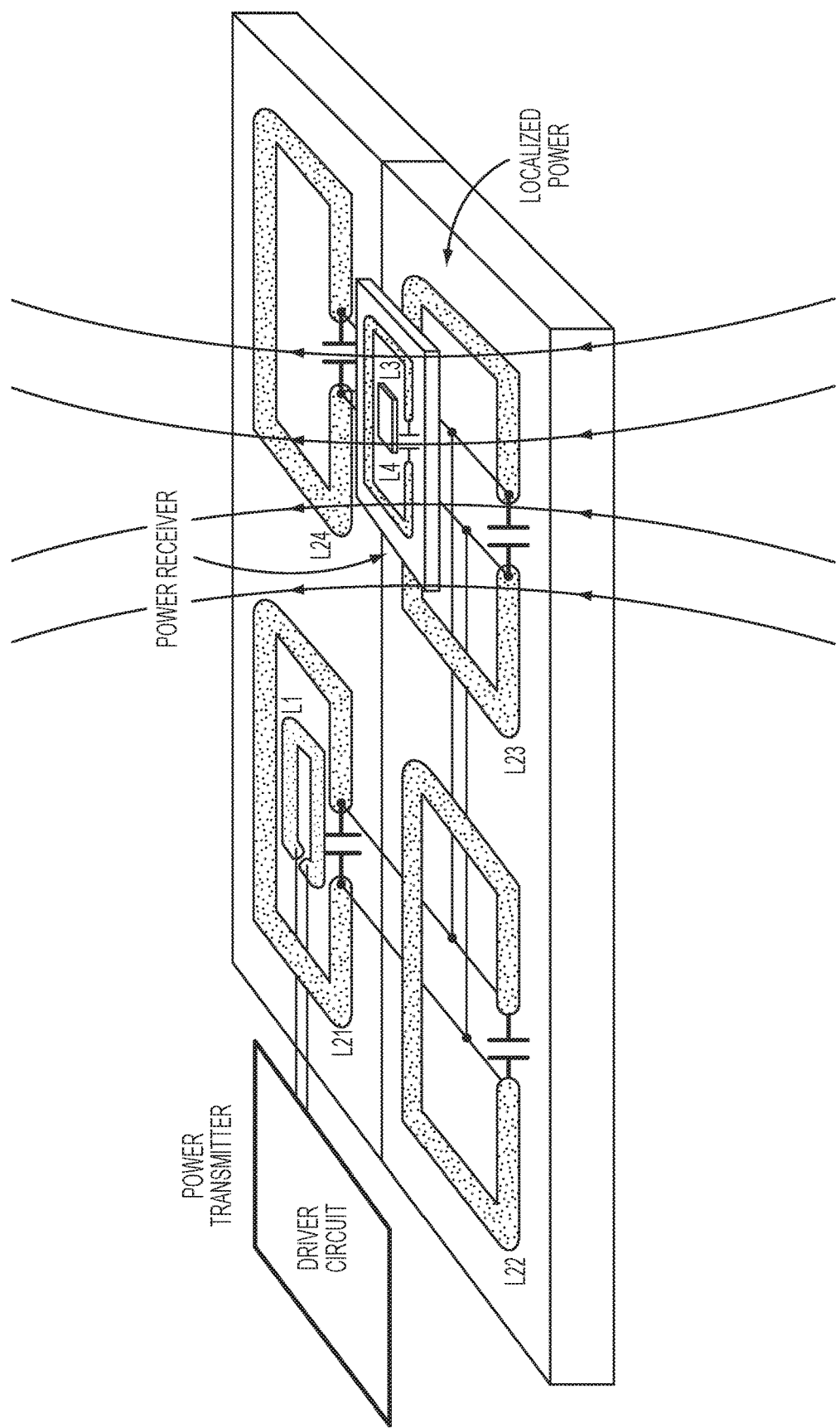
FIG. 2A shows a structure to deliver nearly constant power distribution in 2D and FIG. 2B shows a structure to deliver nearly constant power distribution in 3D.
Figure 2B:
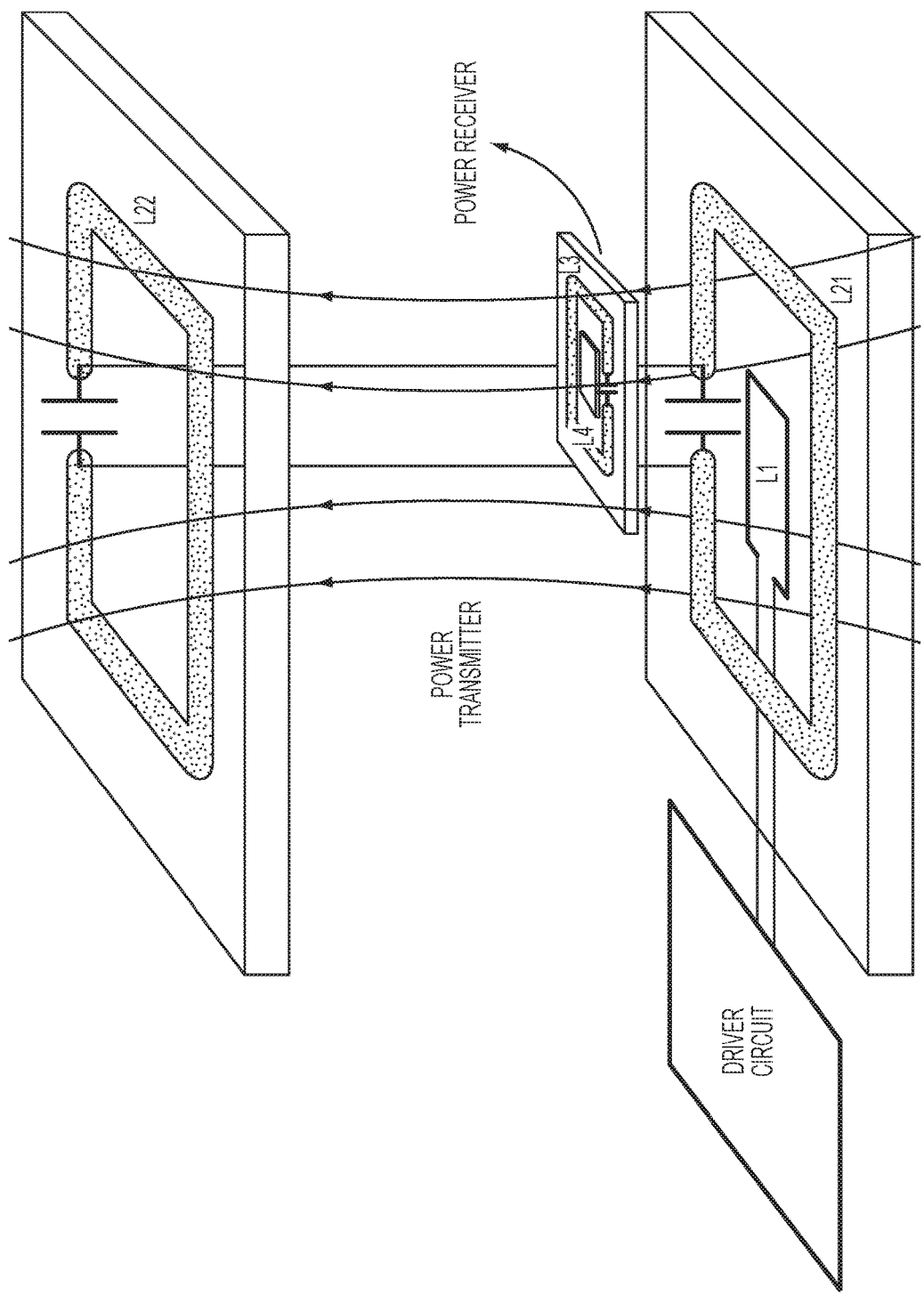

The present system delivers power in 2D and in 3D. FIG. 2A illustrates the proposed multicoil power transmission structure, which is based on a 4-coil inductive link whose primary resonator uses a coil array composed of several identical coil elements connected in parallel, instead of a large single coil. In such a parallel arrangement, the coils in the array have identical electromagnetic field patterns, while one has mutual inductance with the primary coil. Such a structure enables building surfaces or chambers to deliver nearly constant power in 2D (FIG. 2A) and in 3D (FIG. 2B) by leveraging ease of use, simplicity as well as higher PTE and PDL across longer separation distances, thanks to a multicoil resonance-based topology and to a parallel primary resonance coil array.

A 4-coil inductive link topology is suited for long transmission range applications, such as animal research devices, because the maximum power efficiency of such a link is located at separation distances of several cm away from the TX. A 3-coil topology is suited for short range applications, such as wireless smart phone battery chargers, since such a link presents higher PTE than 2-coils and 4-coils link topologies, for separation distances of less than 1 cm. It is seen in FIG. 1 that removing or adding the secondary resonator enables to switch between a 3-coil and a 4-coil topology, respectively, while the power transmitter array topology remains unchanged. Thus, the proposed array can be used with different receiver topologies in order to address applications with different power transmission ranges.

The proposed method 1) requires only a single primary coil, 2) facilitates systematic calibration and tuning because it presents the same coupling for every pair of receiver coil and transmitter coils of the array, 3) naturally localizes power towards a receiver using a limited number of primary coil elements to save energy without the need for a complex detection circuitry to locate the receiver, 4) is scalable by changing n, the number of parallel coil elements in the primary resonance array, and 5) is switchable from a four-coil to a three-coil topology by removing the secondary resonator on the RX side in order to provide optimal PTE and PDL both for short and long range power transmission applications.

FIG. 3 shows electrical circuit models of the proposed multicoil structure for different numbers of coil elements in the primary resonance array. The primary resonance coil of the transmitter uses n coil elements ($L_{2i}$), which are electrically connected in parallel by wires to form an array. Note that i is an integer between 1 and n. FIG. 3A uses 2 primary resonance coil elements (n=2), while FIG. 3B uses four primary resonance coil element (n=4). In such array configurations, only one coil element has a mutual inductance with the primary coil.

Figure 4A:
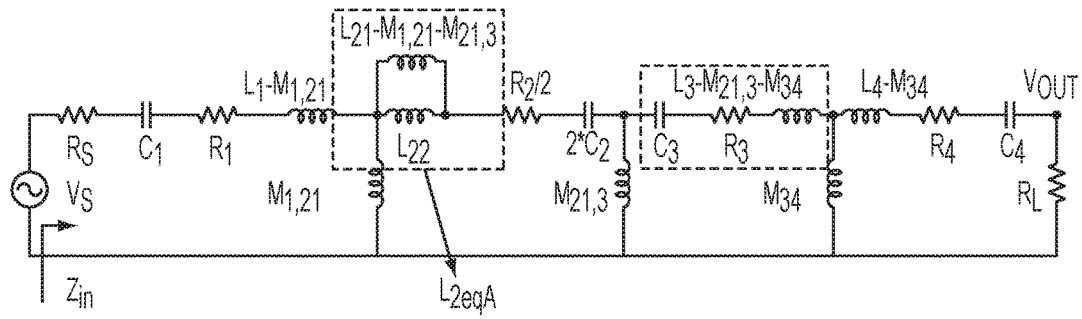
FIG. 4 includes FIG. 4A and FIG. 4B which show circuit equivalents of multicoil parallel array inductive links for two possible locations of the receiver in FIG. 3A, in FIG. 4A, both the primary coil and the secondary resonance coil have mutual inductance with the same primary resonance coil, in FIG. 4B the primary coil and the secondary resonance coil have mutual inductance with individual primary resonance coils.
Figure 4B:
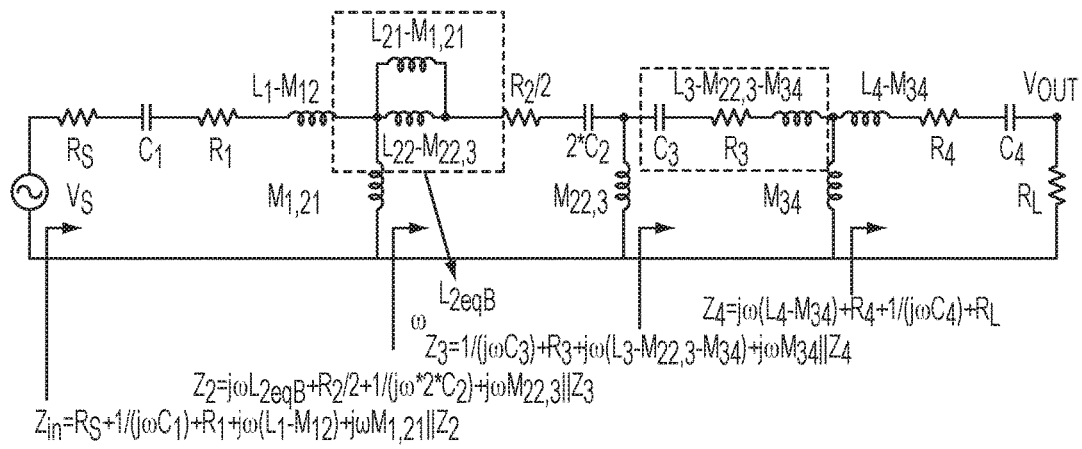

The proposed link is modeled, and the low coil coupling coefficient (k) between the primary and the secondary coils is assessed by calculating the equivalent inductance for an array of n identical primary resonance coil elements connected in parallel. The equivalent circuit of such an array slightly differs depending on the location of the primary coil. FIG. 4A presents the equivalent circuits of the link shown in FIG. 3A, when the receiver coils are located above $L_{21}$, while FIG. 4B presents the equivalent circuits for the same link, but when the receiver coils are located above $L_{22}$. Thus, two possible locations of the receiver (RX) above the primary resonators present two different equivalent circuits illustrated in FIG. 4A and FIG. 4B. The equivalent inductances of the primary resonance array are calculated for both locations of the receiver coils, and are given by Eq. (1) and Eq. (2), respectively, with $L_{21}=L_{22}=L_2$, $M_{1,21}=M_{12}$ and $M_{21,3}=M_{22,3}=M_{23}$.

$$L_{2eqA} = (L_2) \| (L_2 - (M_{12} + M_{23})) \quad (1)$$

$$= \frac{L_2^2 - L_2 \times (M_{12} + M_{23})}{2 \times L_2 - (M_{12} + M_{23})}$$

$$L_{2eqB} = (L_2 - M_{12}) \| (L_2 - M_{23}) \quad (2)$$

$$= \frac{L_2^2 - L_2 \times (M_{12} + M_{23}) + M_{12} \times M_{23}}{2 \times L_2 - (M_{12} + M_{23})}$$

If the mutual couplings $M_{12}$ and $M_{23}$ are assumed to be small, the following approximation can be made.

$$M_{12} \times M_{23} \approx 0 \Rightarrow L_{2eqB} = L_{2eqA} \quad (3)$$

Eq. (3) shows that changing the location of the receiver coils does not have a significant effect on the equivalent inductance of the primary resonance coil array as well on the coupling and PTE. Then, if more than two coils are connected in parallel (n>2), such as in the case shown in FIG. 3B, the equivalent inductances are given by $$L_{2eqA,n\text{-}coil} = \left(\frac{L_2}{n-1}\right) \| (L_2 - (M_{12} + M_{23})) \quad (4)$$

$$= \frac{L_2^2 - L_2 \times (M_{12} + M_{23})}{n \times L_2 - (n-1) \times (M_{12} + M_{23})}$$

$$L_{2eqB,n\text{-}coil} = \left(\frac{L_2}{n-2}\right) \| (L_2 - M_{12}) \| (L_2 - M_{23}) \quad (5)$$

$$= \frac{L_2^2 - L_2 \times (M_{12} + M_{23}) + M_{12} \times M_{23}}{n \times L_2 - (n-1) \times (M_{12} + M_{23}) + (n-2) \times M_{12} \times M_{23}/L_2}$$

$$L_{2eqB,n\text{-}coil} = L_{2eqA,n\text{-}coil} \quad (6)$$

where $L_{2i} = L_2$, $M_{1,21} = M_{12}$ and $M_{2i,3} = M_{23}$ for $1 \leq i \leq n$. Since mutual couplings $M_{12}$ and $M_{23}$ are assumed to be small, product $M_{12} \times M_{23}$ tends to 0. Thus, it can be shown that Eq. (5) can be approximated by Eq. (4), which yields Eq. (6), suggesting that the location of the receiver has practically no impact on the performance of the link.

Such a behavior can be verified by assessing the effect of the number of coils in the primary resonance array on the link coupling and on the PTE of the equivalent circuit model depicted in FIG. 4. The scattering parameter S21, also referred as the transmission coefficient, can measure the end-to-end link coupling between a generic transmitter and a generic receiver. Therefore, it is used to measure the link coupling of the proposed multicoil structure. Note that in the case of a 2-coil inductive link, the transmission coefficient is equivalent to the well-known coil coupling coefficient (k), which measures the coupling between two coils. The transmission coefficient and the PTE of the proposed inductive structure are defined as follow $$S21 = 20 \times \log(V_{out}/V_s) \quad (7)$$

$$PTE = \frac{P_{out}}{P_{in}} = \left(\frac{V_{out}}{V_s}\right)^2 \times \frac{Z_{in}}{R_L} \quad (8)$$

where $V_{out}/V_s$ in (7) and (8) are obtained by circuit analysis from simplified circuits shown in FIGS. 4A and 4B, which is presented in (9)

$$\frac{V_{out}}{V_s} = \frac{R_L}{Z_{in}} \times \frac{j\omega M_{1,21}}{j\omega M_{1,21} + Z_2} \times \frac{j\omega M_{22,3}}{j\omega M_{22,3} + Z_3} \times \frac{j\omega M_{34}}{j\omega M_{34} + Z_4} \quad (9)$$

In FIG. 4, the value of $L_{2eqA,n\text{-}coil}$ and $L_{2eqB,n\text{-}coil}$ of the corresponding equivalent circuits are calculated using equations (4) and (5), respectively. Since $V_{out}/V_s$ depends on $L_{2eqA,n\text{-}coil}$ and $L_{2eqB,n\text{-}coil}$, which values are strongly related to n, (7) and (8) are used to plot PTE and S21 against n, the number of coil elements in the primary resonance array.

Figure 5A:
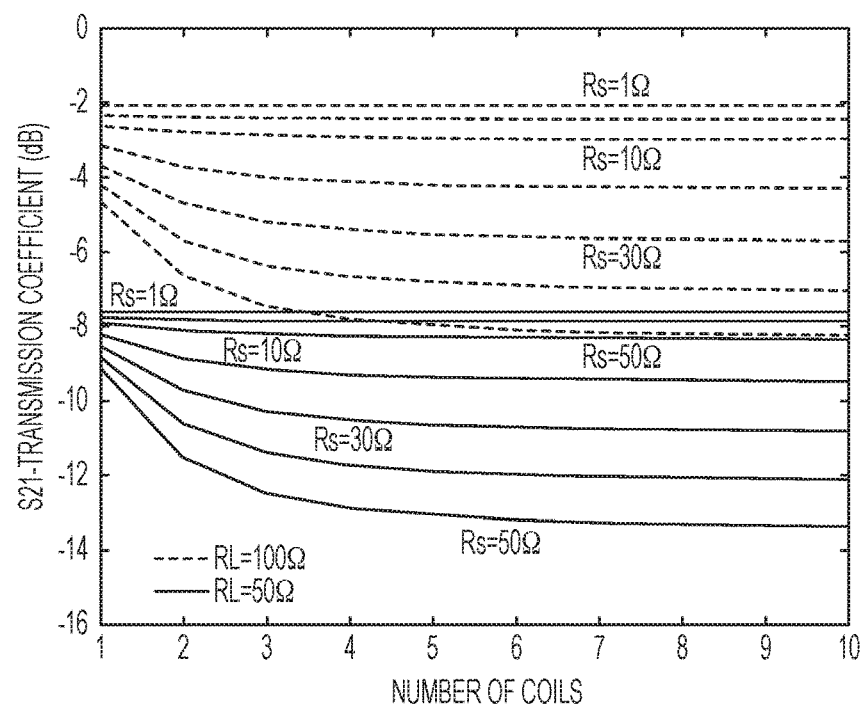
FIG. 5 includes FIG. 5A and FIG. 5B which are graphs showing results of a simulation of the effect of adding multiple coils in parallel over, in FIG. 5A, the transmission coefficient, and in FIG. 5B, the power transfer efficiency, while the source resistor ($R_S$) is swept from 1Ω to 50Ω, at $R_L$, equals 50Ω and 100Ω.
Figure 5B:
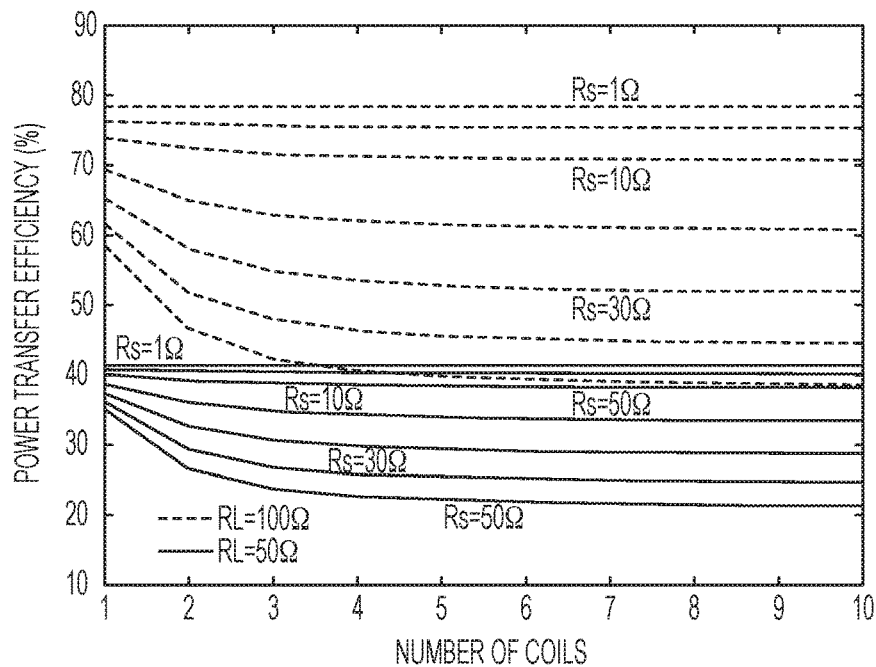

The resulting expressions are plotted in FIG. 5 for n ranging from 1 to 10, and for a frequency of 13.56 MHz. The characteristics of the coil employed for this simulation are presented in the Table shown in FIG. 10. In this simulation, a reasonable assumption is made that the coupling coefficient between $L_1$ and $L_{2i}$ is the same as the coupling coefficient between $L_3$ and $L_4$ ($k_{1,21} = k_{34} = 0.2$), and $k_{2i,3} = 0.05$. Note that $L_{4W}$ is a wire wound planar coil used for demonstrating the 3-coil link configuration which uses $L_1$, $L_{2i}$ and $L_{4W}$.

FIG. 5 shows the simulation results obtained with Matlab™ software for Eq. (7) and Eq. (8) for a link having a primary resonance array which is using up to 10 coil elements. Equations developed for identical inductances are applied to the general equations of transmission coefficient Eq. (7) and power efficiency Eq. (8). FIG. 5A illustrates the transmission coefficient as a function of n, the number of coil elements connected in parallel. It is worth noting that similar results are obtained when 1) both the primary coil and the secondary resonance coil have mutual inductances with the same primary resonance coil, and when 2) the primary coil and the secondary resonance coil have mutual inductances with different primary resonance coils in the array. In FIG. 5, resistors $R_S$ and $R_L$, are swept in order to assess the effect of varying the source resistor and the load values over the performance of the link. It can be seen that these two parameters have significant effect when $R_S$ is big (FIG. 5). However, if $R_S$ is small, simulation shows that increasing the number of parallel coil elements in the primary resonance array has little effect on the PTE and S21. Thus, utilizing a power driver circuit with a low output resistor should significantly decrease the dependency of the proposed link performance over the number of coil elements in the array, as S21 and P stay nearly constant. This suggests that highly scalable and energy-efficient 2D and 3D power transfer systems can be obtained based on the proposed parallel array structure, if a power driver circuit with a sufficiently low output resistor is employed.

Prototypes were built. The implemented prototypes use printed spiral coils fabricated through standard printed circuit board processes. The table presented in FIG. 10 shows specifications of the coils employed in the power chamber prototype. Also, the table presented in FIG. 11 presents the coil coupling coefficients ($k_{i,j}$), the mutual inductances between the coils ($M_{i,j}$) at a frequency of 13.56 MHz, and the distances between them ($d_{i,j}$). Note that $$k_{i,j} = V_j/V_i \times (L_i/L_j)^{0.5} \quad (10)$$

where $V_j/V_i$ can be measured using a Network Analyzer. These small measured $M_{i,j}$ values confirm the assumption made to derive (3) and (6) i.e. $M_{12} \times M_{23} \approx 0$. Different Class E power amplifiers with measured output resistor values of 20Ω and 8Ω are employed to drive the 4-coil link at 13.56 MHz and the 3-coil link at 200 kHz, respectively.

Figure 6:
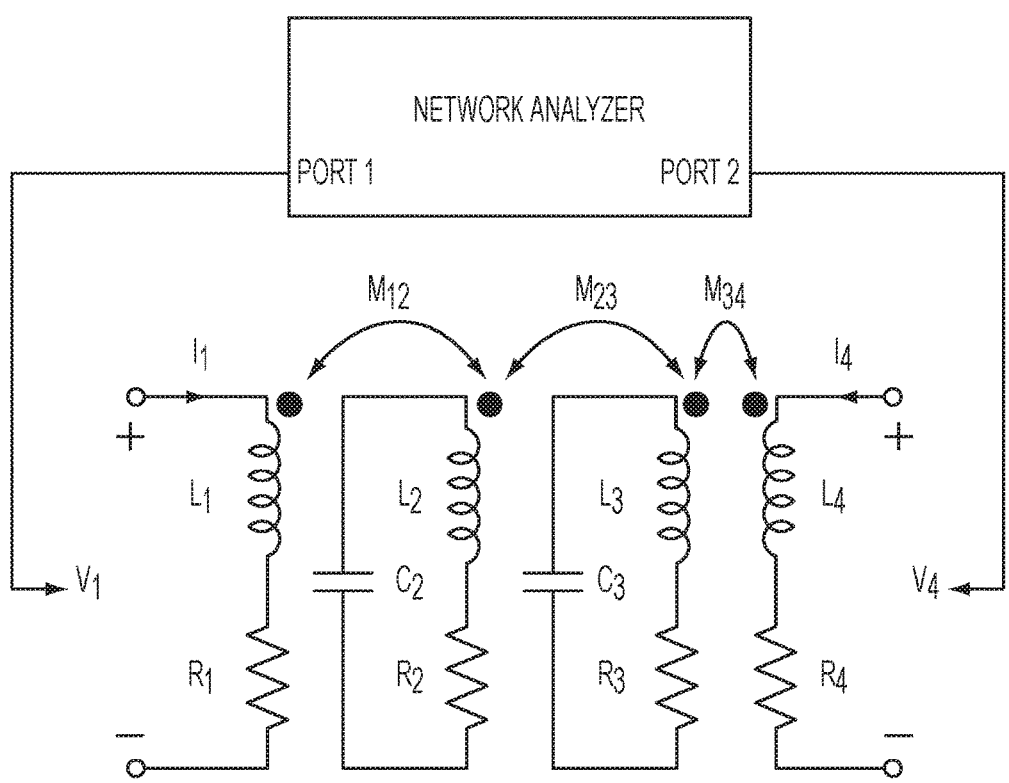
FIG. 6 shows a measurement scheme for testing the inductive link, $L_1$ (primary coil) and $L_4$ (secondary coil) are connected to a network analyzer, while $L_{2i}$ (primary resonance coil array) and $L_3$ (secondary resonance coil) are tuned at a frequency of 13.56 MHz.

Experimental results are obtained by measuring the output of the prototypes under test using a network analyzer (such as Agilent HP 8753E). FIG. 6 illustrates the connections between the network analyzer and the test setup.

Inductors $L_1$ and $L_4$ (or $L_{4w}$ in the case of a 3-coil link configuration) are directly connected to the network analyzer. The resistance of the ports of the network analyzer is 50Ω. Hence, measurement results can directly be compared with simulation results presented in FIG. 5, for the case $R_L=R_s=50\Omega$, since identical source and load resistors are employed in both cases. As for other types of inductive links, source and load resistors have a significant effect on S21 and PTE of the array. For example, a coil array having a transmission coefficient of −13 dB and n=4 can exhibit a PTE of only 24%, if the network analyzer has $R_L=R_s=50\Omega$, while the same link can exhibit a PTE close to 80%, if $R_s=1\Omega$ and $R_L=100\Omega$. For representative results, the effect of the source resistor of the network analyzer is removed by mathematically converting the scattering parameters to Z parameters. Then, a representative value of the PTE of the link under test is obtained by adjusting the results according to realistic values of $R_S$ and $R_L$.

A power transmission surface prototype based on the proposed array structure was built. The primary resonance coil array was enclosed in a fiberglass box to comply with smart animal research systems requirements. The primary resonance array is composed of four coil elements (n=4). The primary coil $L_1$ is located directly beneath $L_{21}$, and has mutual inductance with $L_{21}$ only, in this case. Thus, the primary resonance array covers an area that is four times bigger than a unit coil element, while it is driven by only one primary coil $L_1$. The four coil elements $L_{2i}$ in the array have identical electromagnetic field patterns, while only one of them has mutual coupling with the primary coil. Identical S21 are measured when the receiver is located at the center of every four primary resonance coils, the transmission coefficient being equal to −7.6 dB at d=4 cm. The separation distance between each adjacent neighbor coils is 1 mm. The measured transmission coefficients between adjacent neighbor coils is −9.5 dB. Thus, the electromagnetic field is fairly constant everywhere above the primary resonance coil array. There is more variation in the coil coupling for the 3-coil link than for the 4-coil link. The maximum transmission coefficient equals −7 dB, while it reaches −11 dB right between adjacent neighbor coils, and −13 dB in the worst case above the array.

Figure 7:
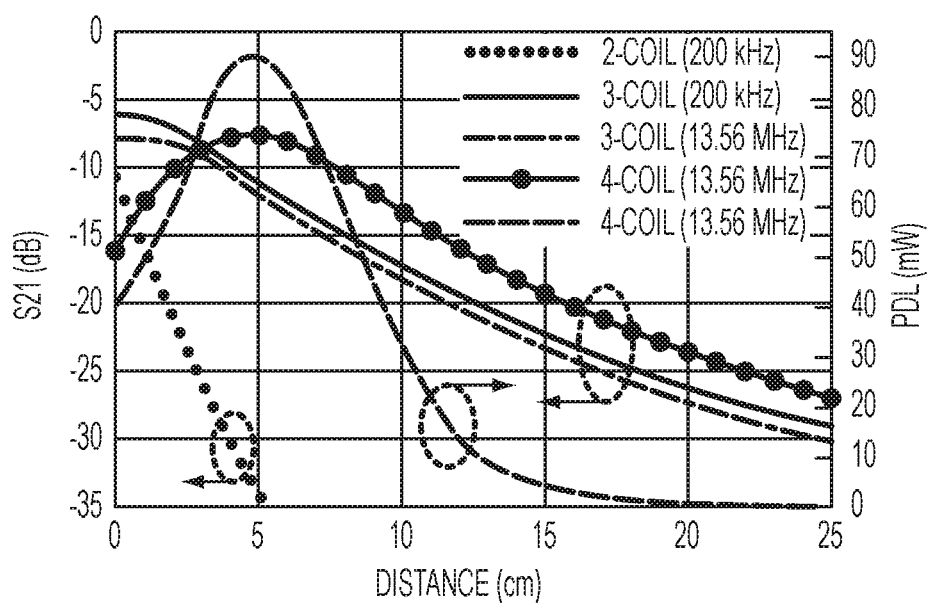
FIG. 7 is a graph showing the measured transmission coefficients (S21) as a function of separation distance for a 4-coil and a 3-coil chamber configuration compared with a prior art 2-coil inductive link (all measurements use $R_S=R_L=50Ω$), and PDL for a 4-coil link ($R_S=20Ω$, $R_L=100Ω$)

FIG. 7 shows the transmission coefficients against the separation distance between the coil array and the receiver, while the receiver is located in the center of one coil element $L_{2i}$ of the array. Note that the transmission coefficient corresponds to S21, the scattering parameter between ports 1 and 2 of the network analyzer (see FIG. 6). For this prototype, maximum coil coupling is obtained at a distance of 4 cm. Moreover, identical transmission coefficients are measured for every four pairs RX-$L_{2i}$, where i is an integer between 1 and 4.

Figure 8A:
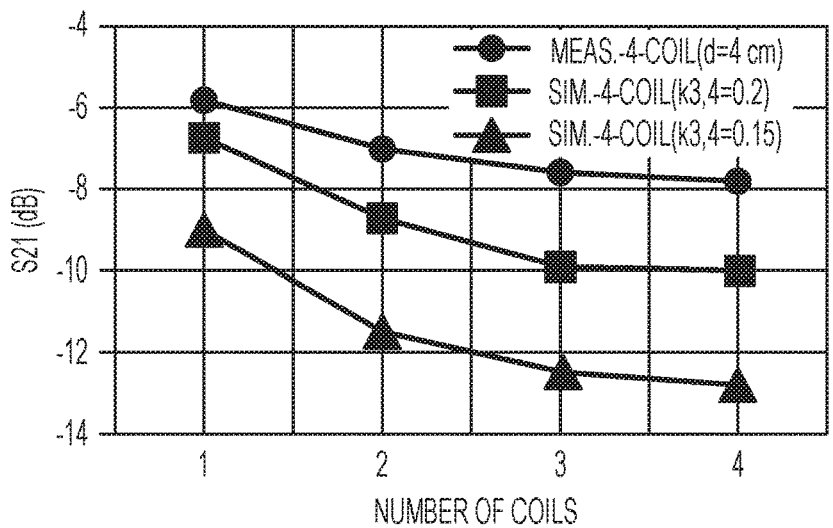
FIG. 8A is a graph showing the measurement (d=4 cm) and simulation ($k_{2i,3}=0.05$) results for transmission coefficients ($R_S=R_L=50Ω$), and FIG. 8 B is a graph showing the measurement (d=4 cm) and simulation ($k_{2i,3}=0.05$) results for PTE and PDL while $R_S$ equals 1Ω and 20Ω ($R_L=100Ω$), as a function of number of additional paralleled coils at 13.56 MHz.
Figure 8B:
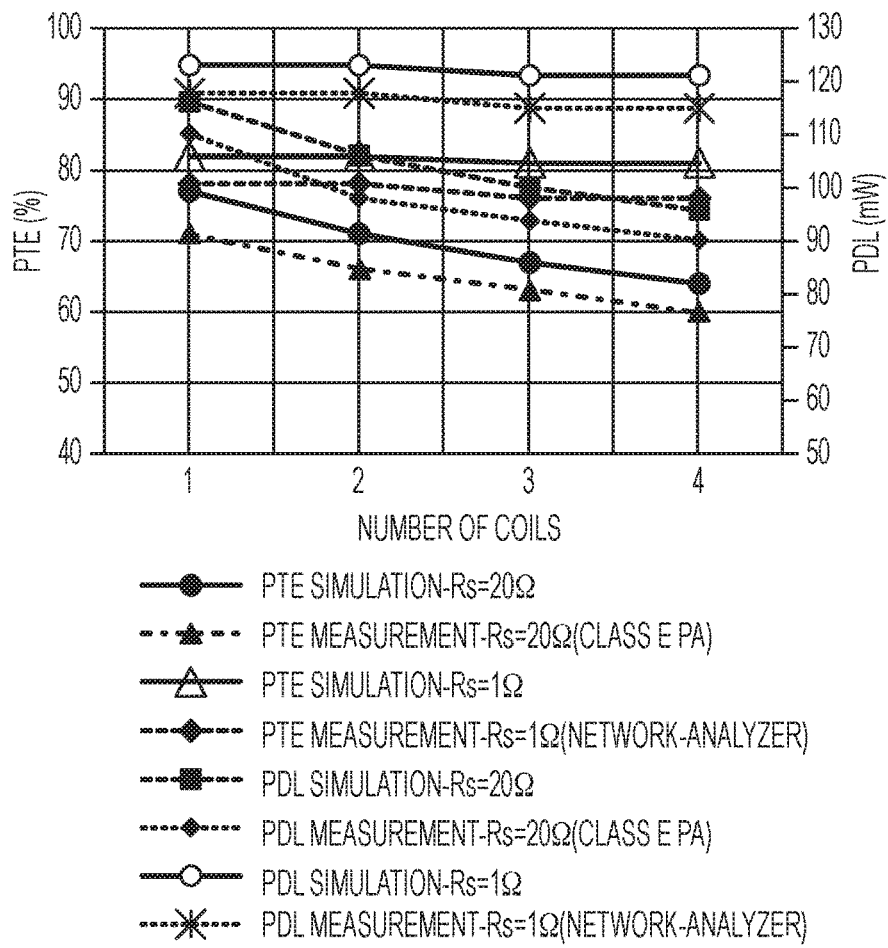

The measured transmission coefficients for both 4-coil and 3-coil chamber configurations are compared in FIG. 8. The transmission coefficient of a conventional 2-coil link is also reported in FIG. 8 for comparison, which link is using $L_1$ and $L_4$ as the primary and the secondary coil. The required PDL in short range applications, like power chargers, is typically on the order of a few Watts, while it is on the order of a few 100 mW for long range applications, such as implantable devices. Additionally, wireless chargers operate at a frequency between 100 and 205 kHz to comply with standards. Therefore, the performance of the 3-coil chamber configuration is measured for operating frequencies of 13.56 MHz as well as of 200 kHz (FIG. 8). The receiver employed for the 3-coil configuration includes one 20AW6-wire wound planar coil. As shown in FIG. 8, a maximum transmission coefficient of −7 dB is measured for the 3-coil configuration, at 200 kHz (using $L_1$, $L_{2i}$ and $L_{4W}$), and a slightly lower transmission coefficient is measured at 13.56 MHz (using $L_1$, $L_{2i}$ and $L_3$) while the maximum transmission coefficient occurs for separation distances of less than 1 cm. The measured PTE and PDL of the 3-coil power chamber are 83.3% ($R_S=1\Omega$ and $R_L=10\Omega$) and 3.87 W ($R_S=8\Omega$ and $R_L=10\Omega$), respectively which is suitable to accommodate various short range applications.

FIG. 8 also presents the measured performance of the 4-coil chamber configuration for an operating frequency of 13.56 MHz. The receiver employed for the 4-coil configuration includes two printed planar coils whose specifications are reported in FIG. 10. A maximum transmission coefficient of −8 dB is measured for this configuration at d=4 cm. The measured PTE and PDL of the 4-coil power chamber are 76% and 115 mW, respectively, for $R_S=1\Omega$ and $R_L=100\Omega$, which is suitable to accommodate various applications.

Figure 9A:
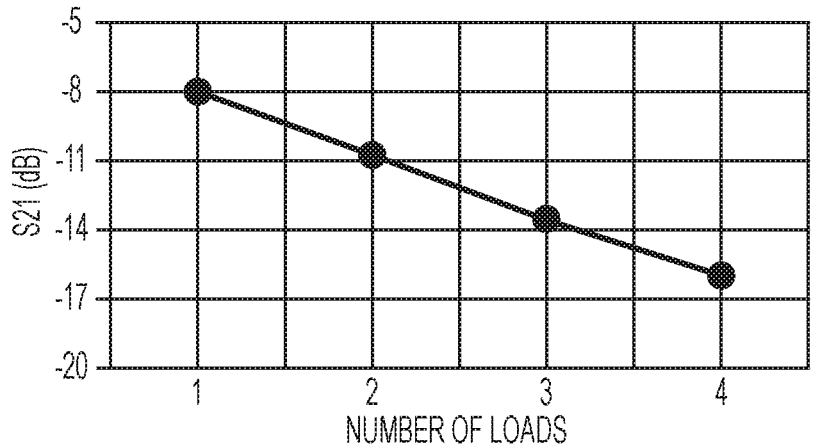
FIG. 9A shows the measured transmission coefficient as a function of the number of loads (d=4 cm, $R_S=R_L=50Ω$)

It was shown by simulation that $R_S$ should be kept small in order to limit the effect of increasing n on the coil coupling, PTE and PDL. The transmission coefficient was experimentally measured as a function of the number of parallel coil elements in the primary resonance array for the presented power chamber, in a 4-coil configuration. The transmission coefficient is reported in FIG. 9A for $1 \leq n \leq 4$ and $R_L=R_S=50\Omega$. Measurements confirm that increasing n decreases the transmission coefficient measured and simulated between each coil elements $L_{21}$ and the receiver, when $R_s$ is significant. The transmission coefficient decreases by 1.2 dB when going from n=1 to n=2, while it decreases by only 0.6 dB and 0.2 dB, when adding a third and a fourth coil, respectively. Measurement results reported in FIG. 9A can be directly compared with simulation results presented in FIG. 5A. An offset between measured and simulated results is attributable to the fact that coil coupling coefficients $k_{1,3}$, $k_{1,4}$ and $k_{2i,4}$ are not modeled for simplicity. Note that coil elements $L_{2i}$ are identical, and tuned at a center frequency of 13.56 MHz.

Figure 9B:
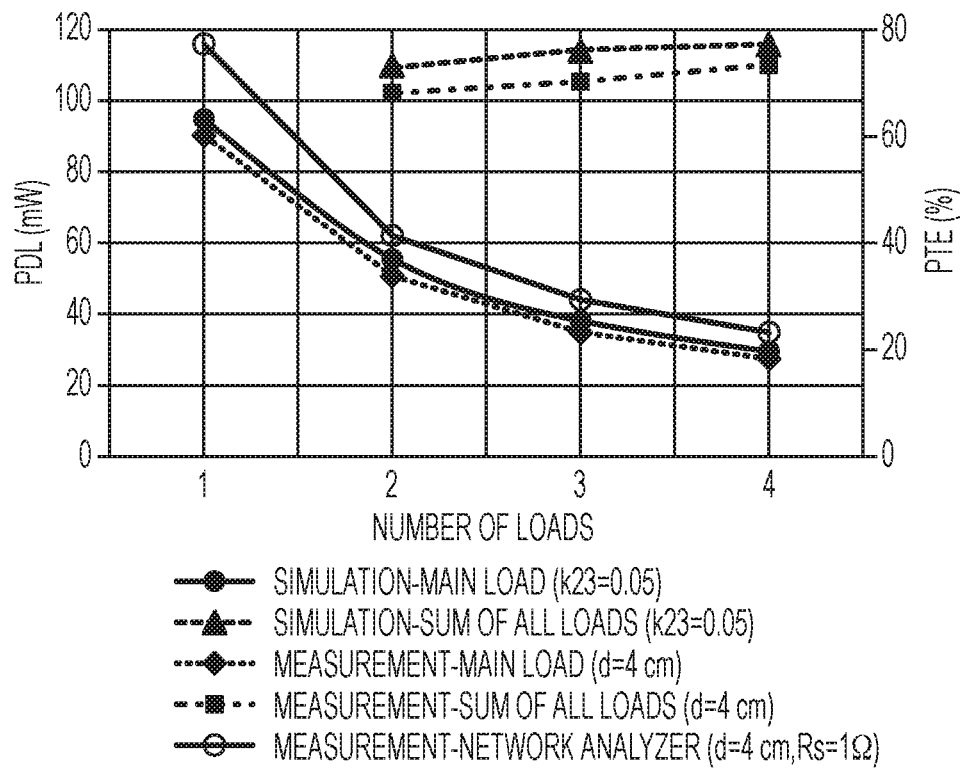
FIG. 9B is a graph for PDL and PTE, as a function of number of loads.

In FIG. 9B, PTE and PDL are measured as a function of the number of parallel coil elements in the array for a 4-coil chamber configuration, and compared with the simulation results for the two following cases: 1) $R_S=1\Omega$, $R_L=100\Omega$ and 2) $R_S=20\Omega$, $R_L=100\Omega$. Since the network analyzer has $R_S=50\Omega$, the normalized performance of the link is assessed by replacing the 50-Ω resistor with a 1-Ω resistor in the calculation after measuring the scattering parameters of the link. Measurement results show that increasing the number of parallel coil element $L_{2i}$ does not significantly affect the PTE and PDL if $R_S$ is small ($R_S<10\Omega$). Then, PTE drops by 10% when $R_S=20\Omega$, for instance. Thus, the effect of increasing n assessed with calculation and simulation in FIG. 9 is confirmed with measurement results.

Simulations demonstrate that the level of electrical field has a 20 dB increase above the areas where there is an inductively coupled load compared to areas where there is no such a load. Hence, since the density of power can be defined by $\vec{E} \times \vec{H}$, or $P=\vec{k}E^2/2\eta_0$, where $\eta_0$ is impedance in free space and $\vec{k}$ is the pointing vector, the transmitted power is localized at the location of the receiver coil.

The PDL of a load under observation decreases proportionally when placing additional loads above the other coil elements of the primary resonance array, which suggests that the transmitted power is distributed across the coil elements of the array that are mutually coupled to a receiver. Such a mechanism allows a power transmission system to localize its transmitted power for saving a significant amount of energy without the need for complex detection and control circuitry.

Figure 12A:
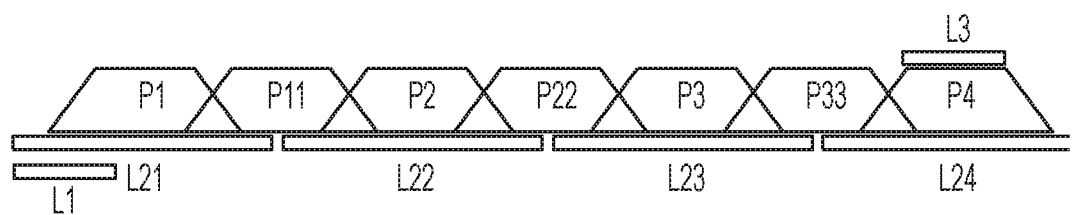
FIG. 12 includes FIG. 12A and FIG. 12B in which conceptual schematics of the resonator based power transmitter array are shown for non-overlapped resonator coil elements structures (FIG. 12A) and for 50% overlapped resonator coil element structures (FIG. 12B), both figures showing the position of the receiver L3.
Figure 12B:
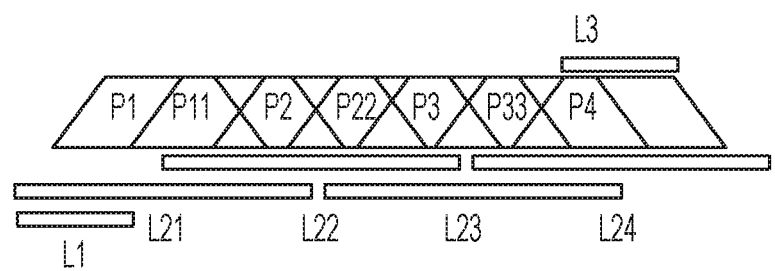
Figure 13A:
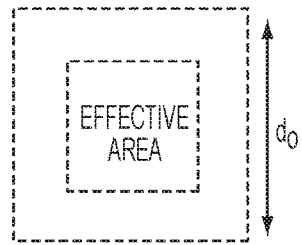
FIG. 13A presents a single transmitter coil and the effective power transmission (maximum flux) area.
Figure 13B:
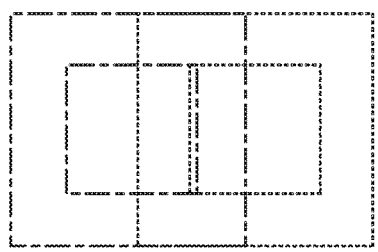
FIG. 13B presents two 50% overlapped transmitter coils the effective area of which is twice the area of a single coil.
Figure 13D:
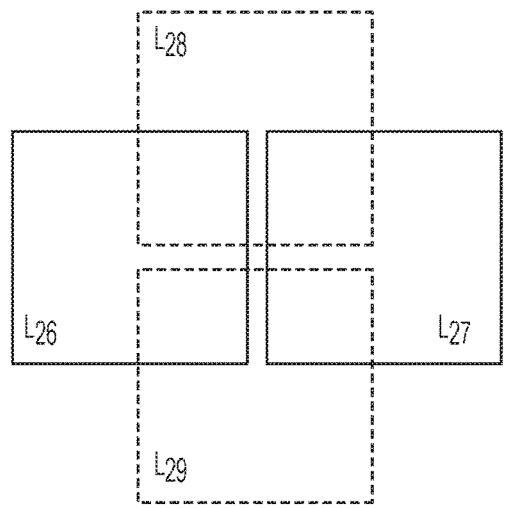
FIG. 13D presents a second FR4 array including 4 coils, tiled over two conductive layers.
Figure 13C:
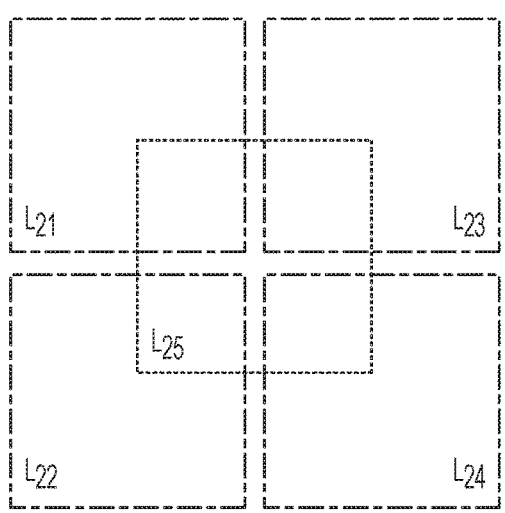
FIG. 13C presents a first FR4 array including 5 overlapping coils, tiled over 2 conductive layers.
Figure 13E:
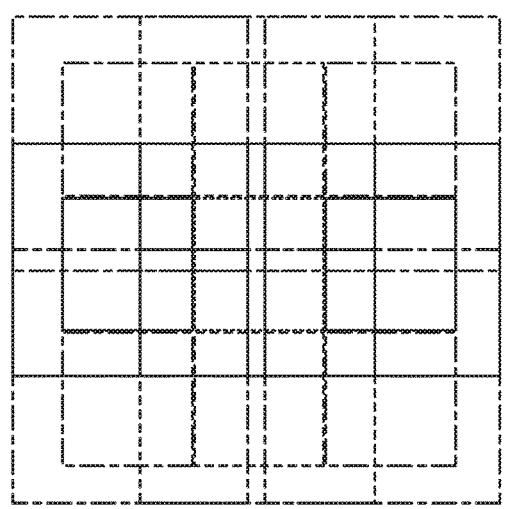
FIG. 13E presents the FR4 layers of FIG. 13C and FIG. 13D superimposed to implement a surface with uniform power transmission density.

FIG. 12 presents a cross sectional view of the power links for non-overlapped resonators (FIG. 12A) and 50% overlapped resonators (FIG. 12B). A 50% overlap for the resonators allows adjusting the effective areas of two neighboring transmitter coils which provides a uniform power transmission. FIG. 12 shows the locations of the receivers above the transmitter resonators. The receivers are labelled P1-P4 when the receiver is centered above a transmitter resonator and the receivers are labelled P11-P33, when the receiver is above and between two center positions P1-P2, P2-P3 and P3-P4, respectively.

FIG. 13 illustrates the effect of the coil overlapping technique. The simplified model of a single transmitter coil and its effective area (in dashed lines) is presented in FIG. 13A. Two coils overlapping by 50% are shown in FIG. 13B. Two FR4 printed circuit boards (PCB) each including coils implemented within two conductive layers (FIG. 13C and FIG. 13D) are superimposed to form an array of 9 overlapped transmitter coils (FIG. 13E). The schematic of the printed transmitter coils on the two FR4 layers are illustrated in FIGS. 13C and 13D. Combination of these two layers results FIG. 13E, which provides a homogenous electromagnetic field for wireless power transmission. This figure shows the quality of adjacent neighbor effective areas. The thickness of a FR4 board is 1.5 mm, and the distance between them is 1.5 mm.

Figure 14B:
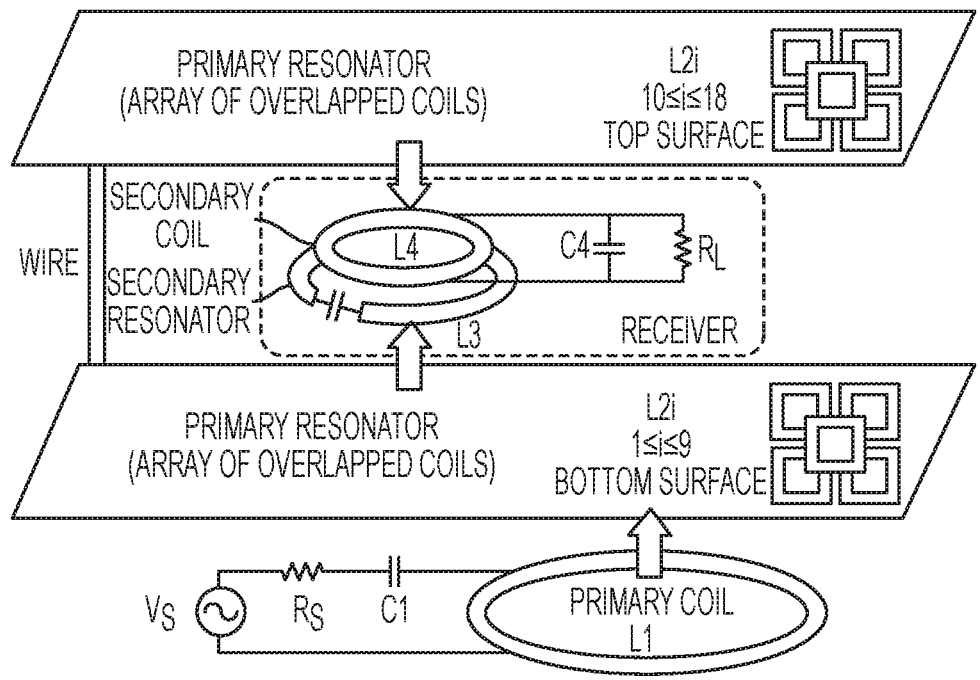

An example block diagram of the uniform 3D power transmission approach is presented in FIG. 14. The 2D power surface is formed by removing the two surface of the 3D structure. FIG. 14A shows a schematic of a 4-coil inductive link including two resonator coils (primary and secondary resonator) in addition to a primary and a secondary coil, in which the primary resonator includes several coils in parallel. The complete wireless power transmission link (FIG. 14B) includes: a power transmitter including a primary coil and a primary resonator made of several overlapped coils tiled over two parallel surfaces, and a power receiver including a secondary resonator, a secondary coil, and a load (modeled by $R_L$).

FIG. 15 shows the equivalent circuit models of the power transmitter and the power receiver for the 2D and 3D approaches. Each surface includes 9 overlapped primary resonators which coil elements are connected in parallel by wires. In the 3D power system, two power surfaces are connected in parallel facing each other with the receiver located between them. The power chamber includes 18 primary resonators, all connected in parallel. In this example, the primary coil, the secondary coil and all resonators (primary and secondary) are tuned at a frequency of 13.56 MHz.

Additionally, a parallel connection between all overlapped coils in the transmitter array (primary resonator) provides natural power localization of the transmitted power towards the receiver. In the 2D power system, the delivered power is transmitted only from the primary resonator located under the power receiver. In the 3D power chamber, when the receiver is located in the middle of two overlapped primary resonators, both top and bottom resonators are activated naturally and contribute to transfer power. In this case, the power transfer efficiency and power delivered to the load are constant and provides a uniform power transmission in z direction.

In the 3D power chamber, the top surface compensates the power delivery drop because of the distance increment from the bottom surface. Depending on the location of the receiver, the top or bottom surfaces have more or less contribution on transmitting power. When the receiver is at the same distance from the bottom and top surfaces, the bottom and top primary resonators transmit half of the delivered power to the receiver. The distance between the surfaces is set to have almost constant power delivery in z direction. This gap is calculated by summing the curves of power delivery as a function of distance (z direction) from above and under the bottom and top surfaces, respectively.

It is well known that the optimal sizes of the transmitter and the receiver coils of an inductive link are function of the separation distance between them, which value depends on the target application. For handheld electronic device charging systems, the distance between the transmitter and receiver is usually less than 1 cm. PTE above 80% and PDL of several Watts can be reached for such a short separation distance, and the power carrier frequency is usually chosen between 100-205 kHz. Charging systems usually employ a 2-coil link topology. The power surface/chamber prototype benefits from 3-coil and 4-coil link topologies for more flexibility. In order to accommodate both short range and long range applications.

In order to compare the proposed prototype with previously published systems, a new figure of merit (FOM) is proposed and is presented in Eq. (11). The FOM is based on relevant indicators of the performance of the inductive link, such as PTE and PDL as well as on geometrical parameters, such as the distance between the RX and TX coils and their diameter. Both the PTE and PDL are considered in this FOM since optimal PTE and PDL are usually reached for different sets of parameters. The FOM is defined as follows:

$$FOM = \frac{PTE \times PDL \times d}{d_{OR}}, \quad (11)$$

where the $d_{OR}$ is the diameter of the receiver coil, and d is the separation distance between the primary resonant coil $L_{2i}$ and the secondary resonant coil $L_3$. Note that parameter d is assumed to be 0.1 cm. Also, $d_{OR}$ equals the diameter of the secondary resonator coil ($L_3$) for the 4-coil surface structure. The proposed prototype exhibits superior FOM for both short- and long-range power transmission applications.

Natural power localization occurs with the present system. The present approach does not require any control and detection circuitry to find the location of the load, since it can naturally localize its transmitted power towards a receiver through a subset of coil elements.

As will be readily understood, a plurality of types of inductive elements could be used with the present approach. It is contemplated that groups of inductive elements electrically connected in parallel could themselves be connected in parallel to allow a single power supply to supply multiple surfaces and/or chambers. Arrays of paralleled resonators can therefore be separated in different groups of resonators which are paralleled by wire. The coils can be in single, overlapped and non-overlapped configurations and different coil sizes and shapes may be used in each group. The resonator groups can be provided at a distance from one another and there is no need to have mutual inductance between the groups. For example, the inductive elements could be grouped in k individual arrays of p inductive elements connected in parallel with wires to implement multiple charging zones activated by a same primary coil and tuned at the same frequency.

The inductive elements could be any type of coil, such as printed, wirewound or litz wire coils.

EXAMPLES

In a 3-coil example configuration, at a carrier frequency of 200 kHz, the chamber prototype presents a PTE of 83.3% and a PDL of 3.87 W, which is perfectly suitable for short range applications. In a 4-coil example configuration, at 13.56 MHz, the proposed chamber prototype presents a PTE of 76% and 53% for separation distances of 4 cm and 8 cm, respectively. Moreover, the chamber prototype can achieve high PDL of 115 mW and 80 mW across separation distances of 4 cm and 8 cm, respectively.

Another example of a comparison between a prior art system and the invention is described in relation with FIG. 16. A wireless mobile unit in the form of a portable device or electrical vehicle with receiver (Rx) coil is inductively powered by an array of transmitter coils that cover a surface, such as a table, a road or a car parking. A chain of transmitter resonators can be employed for providing the electromagnetic field for a larger area than the optimized single transmitter resonator. An array of transmitter coils in the form of a square or chain is used instead of a large single transmitter to keep the efficiency high. A chain of transmitter coils is the simplest model for analyzing transmitter behavior. This type of array can be configured in a resonance based structure. The transmitter resonators can be provided in float or parallel configurations. FIG. 16 presents the equivalent models of these two approaches. Both approaches take advantages of the 3-coil power inductive link principle which includes driver coil L1, primary resonators L21-L24 (transmitter resonators) and receiver coil L3. The primary resonator is extended to several resonators in order to cover a larger area. These additional resonators are electromagnetically coupled (float resonators, FIG. 16A-Prior Art) or paralleled by wire (parallel resonators, FIG. 16B).

The 3-coil structure is efficient for short rage applications while a 4-coil structure is used to transmit power across further distances. In the 4-coil structure, a secondary resonator is used on the receiver side.

A power surface was implemented using printed spiral coils. The specifications of the coils are presented in FIG. 17. The implemented power surface includes 9 overlapped resonators connected in parallel. Four conductive layers are printed on two FR4 PCB layers with a separation distance of 1.5 mm between conductive traces. One 82-pF capacitor is connected in parallel with each primary resonator and mounted on the PCBs. A variable capacitor is connected in parallel with the primary resonator elements for enabling to fine tuning the resonance frequency. Wire wound coils are used on the receiver side (L3 and L4). The power delivered to the load (PDL) is measured for the power surface prototype at a typical distance of d=4 cm. The transmission coefficient (S21) of the link is measured with a network analyzer. S21 equal 10±0.2 dB at d=4 cm, within the effective area of the array. The measured dimension of the effective area is 22.5×22.5 cm$^2$. When the receiver is located within this effective area, it receives maximum power, and the PDL stays within 10% (12 mW) of the maximum delivered power everywhere within this area. The measured PDL and PTE of the link are 120 mW and 69%, respectively. A resistor of 100Ω is utilized to model the typical load attached to the receiver, and the frequency of the power carrier is 13.56 MHz. A Class E power amplifier is utilized to drive the primary coil. FIG. 18 presents the measured PDL of one power surface as a function the distance between the primary resonator array and the secondary resonator coil. As it can be seen, the optimum separation distance is 3 cm≤d≤5 cm, which reach to the maximum PDL and PTE.

Two of such power surfaces are employed to form a 3D power chamber. The 3D power chamber prototype includes 18 overlapped primary resonator coil elements equally separated in the bottom and top surfaces (each of which includes 9 overlapped primary resonator coil elements). Both surfaces are connected in parallel to form a single primary resonator coil array. The separation distance between both surfaces is 16 cm. The measured effective volume of the 3D power chamber is 22.5×22.5×14 cm$^3$. Like for the measured surface, the transmission coefficient (S21) of the 3D power link with a network analyzer equals 12±0.1 dB and is uniform within inside the effective volume. A maximum variation of 6% (6 mW) of the PDL is measured everywhere inside the effective volume of the 3D chamber. Nearly identical PDL levels around 100 mW are measured for all three locations, while the measured PTE equals 59%.

FIG. 19A presents the PDL of an example 3D power chamber system as a function of separation distance (d). The 3D power chamber provides nearly constant PDL across the z direction (1 cm≤d≤15 cm). In this case, when d increases, less power is delivered from the bottom surface, while the top surface compensates for this power delivery drop. As a result, the PDL and the PTE of the 3D power chamber is not sensitive to the location and motion of the receiver inside the effective volume of the 3D power chamber.

FIG. 19A shows the measured PDL provided by the 3D power chamber, including 18 primary resonators as a function of d for three scenarios: 1) Only the PDL of the bottom surface is considered, 2) Only the PDL of the top surface is considered, and 3) PDL is measured for the whole chamber including both surfaces (bottom and top). When the PDL of only one power surface (top or bottom) is considered, it can be seen that the measured PDL presents a peak at an optimal distance of around 4 cm from the surface in the z direction. However, for the 3D chamber including both surfaces, the measured PDL is the sum of the PDL of both individual surfaces, and remains almost constant along z.

Rotation and angular misalignment of the receiver coil is unavoidable in this application. FIG. 19B presents the measured PDL of the 3D power chamber as a function of the angle while the receiver is rotated inside the chamber. It shows that the PDL of the 3D power chamber is not sensitive to the angular misalignment up to an angle of 30°. Moreover, the link keep deliver significant power until it reaches a misalignment angle as high 80°.

The whole wireless power transmission chain includes a power driver circuit, a 3D inductive link, and a power recovery circuit. The power recovery circuit includes a rectifier and a regulator, which recover the power transmitted by the surface/chamber and converts it into DC supply voltage. A super-capacitor is connected after the rectifier in order to store the received power and avoid PDL variations, and to decrease the DC voltage ripple.

FIG. 20 presents an example block diagram of a power link. The input power and the power transfer efficiency of each block are indicated in FIG. 20 for both approaches. The regulated DC power is 60 mW at d=4 cm for a single surface and 50 mW inside the 3D chamber, respectively. FIG. 21 summarizes the specifications of the proposed power surface, and 3D power chamber illustrated in FIG. 20. The figure of merit (FOM) is calculated for both 2D and 3D approaches and is presented in FIG. 21. The 3D power chamber has a FOM almost 3 times bigger than prior art systems.

The proposed approach 1) provides nearly-uniform power delivery in 3D, 2) provides natural power localization (avoids using detection mechanism for power localization), 3) is robust against angular misalignment of the receiver up to 80°, 4) does not need any closed-loop power control mechanism, and 5) provides high power delivery and power efficiency.

In summary, there is provided a power transmission system for wirelessly charging a load comprising: a power driver circuit; a wireless power transmitter having: a transmitter primary inductive unit coupled to the power driver circuit and configured to generate an alternating magnetic field; a transmitter primary resonator receiving electrical power from the transmitter primary inductive unit by electromagnetic induction, the transmitter primary resonator including n inductive elements electrically connected in parallel to form an array, a subset m of the n inductive elements being in mutual inductance with the transmitter primary inductive unit; a wireless power receiver having: a receiver secondary inductive unit for receiving electric power by magnetic field resonance; a load electrically connected to and being supplied by the wireless power receiver; wherein the wireless power transmitter and the wireless power receiver are in mutual inductance.

Depending on the application, the wireless power receiver can include an optional receiver secondary resonator in mutual inductance with the receiver secondary inductive unit.

For most applications, the inductive element is a coil.

In an example embodiment, the inductive elements of the transmitter primary resonator have matching electrical characteristics. In an example embodiment, the inductive elements of the transmitter primary resonator are tuned to a same resonance frequency.

Optionally, at least two of then inductive elements overlap.

In one embodiment, the array of n inductive elements forms a power surface. In another embodiment, two arrays of n inductive elements are provided facing one another at a distance from one another to form a power chamber.

Optionally, the transmitter primary resonator further includes groups of inductive elements electrically connected in parallel to form parallel groups of arrays.

In one embodiment, the wireless power transmitter and the wireless power receiver are tuned to a same resonance frequency.

In an example application, the load is a power storage unit.

Another way of summarizing the present power surface or chamber is that the power transmission system has nearly constant electromagnetic field distribution in 3D comprising: at least one primary coil and one primary resonance array made of several coils connected in parallel for generating the electromagnetic field distribution; a power driver circuit for activating the coils; and a secondary coil and optional secondary resonance coil to recover the generated electromagnetic field and power up an electric device.

An example application for this power transfer system is neural stimulation experiment setups targeting freely-moving rodents where a power-hungry headstage in mounted on the head of the animal and stimulates (optically or electrically) the neurons while recording the neural activity from multiple readout channels.

The embodiments described above are intended to be exemplary only. The scope of the invention is therefore intended to be limited solely by the appended claims.

The invention claimed is:

1. A power transmission system for wirelessly charging a load comprising:
   a power driver circuit;
   a wireless power transmitter having:
      a transmitter primary inductive unit coupled to said power driver circuit and configured to generate an alternating magnetic field;
      a transmitter primary resonator receiving electrical power from the transmitter primary inductive unit by electromagnetic induction, said transmitter primary resonator including n inductive elements electrically connected together in parallel to form an array, a subset m of said n inductive elements being in mutual inductance with said transmitter primary inductive unit;
   a wireless power receiver having:
      a receiver secondary inductive unit for receiving electric power by magnetic field resonance;
   a load electrically connected to and being supplied by said wireless power receiver;
   wherein said wireless power transmitter and said wireless power receiver are in mutual inductance.

2. The resonance-based inductive power transmission system as claimed in claim 1, wherein said wireless power receiver further comprises
   a receiver secondary resonator in mutual inductance with said receiver secondary inductive unit.

3. The resonance-based inductive power transmission system as claimed in claim 1, wherein said inductive element is a coil.

4. The resonance-based inductive power transmission system as claimed in claim 1, wherein said array of n inductive elements forms a power surface.

5. The resonance-based inductive power transmission system as claimed in claim 1, further comprising two of said array of n inductive elements provided facing one another at a distance from one another to form a power chamber.

6. The resonance-based inductive power transmission system as claimed in claim 1, wherein at least two of said n inductive elements overlap.

7. The resonance-based inductive power transmission system as claimed in claim 1, wherein said transmitter primary resonator further includes groups of inductive elements electrically connected in parallel to form parallel groups of arrays.

8. The resonance-based inductive power transmission system as claimed in claim 1, wherein said load is a power storage unit.

9. The resonance-based inductive power transmission system as claimed in claim 1, wherein said n inductive elements of said transmitter primary resonator have matching electrical characteristics.

10. The resonance-based inductive power transmission system as claimed in claim 1, wherein said n inductive elements of said transmitter primary resonator are tuned to a same resonance frequency.

11. The resonance-based inductive power transmission system as claimed in claim 1, wherein said wireless power transmitter and said wireless power receiver are tuned to a same resonance frequency.

* * * * *